(12) United States Patent
Hinata et al.

(10) Patent No.: US 7,830,595 B2
(45) Date of Patent: Nov. 9, 2010

(54) ELECTRO-OPTICAL DEVICE, ELECTRONIC APPARATUS, PROTECTIVE MEMBER, AND METHOD OF MANUFACTURING PROTECTIVE MEMBER

(75) Inventors: Shoji Hinata, Matsumoto (JP); Shinji Sakurai, Matsumoto (JP)

(73) Assignee: Sony Corporation, Tokyo (JP)

( * ) Notice: Subject to any disclaimer, the term of this patent is extended or adjusted under 35 U.S.C. 154(b) by 596 days.

(21) Appl. No.: 11/533,926

(22) Filed: Sep. 21, 2006

(65) Prior Publication Data

US 2007/0065091 A1    Mar. 22, 2007

(30) Foreign Application Priority Data

Sep. 22, 2005 (JP) ............................. 2005-275146
Sep. 22, 2005 (JP) ............................. 2005-275147
Sep. 22, 2005 (JP) ............................. 2005-275148
Jun. 28, 2006 (JP) ............................. 2006-177828

(51) Int. Cl.
*G02F 1/00* (2006.01)
*G02F 1/03* (2006.01)
*G02F 1/07* (2006.01)
*G02F 1/29* (2006.01)

(52) U.S. Cl. .................... 359/321; 359/245; 359/315
(58) Field of Classification Search .............. 359/245, 359/315, 321
See application file for complete search history.

(56) References Cited

U.S. PATENT DOCUMENTS 5,044,734 A * 9/1991 Sperl et al. .................. 349/67
6,355,125 B1   3/2002 Tahon et al.
6,498,672 B2 * 12/2002 Saitoh .......................... 359/245
2007/0181456 A1   8/2007 Kusuda et al.

FOREIGN PATENT DOCUMENTS

| CN | 1547085 | 11/2004 |
|----|---------|---------|
| JP | 60-080432 | 6/1985 |
| JP | 5-330107 | * 12/1993 |
| JP | 11-142818 | 5/1999 |
| JP | 11-174417 | 7/1999 |
| JP | 11-352566 | 12/1999 |
| JP | 2000-122037 | 4/2000 |
| JP | 2000-332306 | 11/2000 |
| JP | 2001-066575 | 3/2001 |
| JP | 2002-341319 | 11/2002 |
| JP | 2003-295780 | 10/2003 |
| JP | 2007-116074 | * 1/2005 |
| WO | WO 2005/064451 | 7/2005 |

* cited by examiner

*Primary Examiner*—Ricky L Mack
*Assistant Examiner*—Brandi N Thomas
(74) *Attorney, Agent, or Firm*—K&L Gates LLP

(57) ABSTRACT

An electro-optical device includes an electro-optical panel including a pair of substrates and an electro-optical layer between the pair of substrates, a protective member composed of a light-transmitting substrate mounted on at least one of the pair of substrates, and a holding member that holds the electro-optical panel. The protective member has a thick portion where the thickness of the light-transmitting substrate is large, thin portions where the thickness of the light-transmitting substrate is small, the thin portions being provided at the outer circumference of the light-transmitting substrate, and step portions provided between the thick and thin portions. The holding member has fitting portions that are nested into the step portions of the protective member. The light-transmitting substrate and the electro-optical panel are bonded to each other with an adhesive layer.

12 Claims, 14 Drawing Sheets

ELECTRO-OPTICAL DEVICE, ELECTRONIC APPARATUS, PROTECTIVE MEMBER, AND METHOD OF MANUFACTURING PROTECTIVE MEMBER

RELATED APPLICATIONS

This application claims priority to Japanese Patent Application Nos. 2005-275146 filed Sep. 22, 2005, 2005-275147 filed Sep. 22, 2005, 2005-275148 filed Sep. 22, 2005, and 2006-177828 filed Jun. 28, 2006 which are hereby expressly incorporated by reference herein in their entirety.

BACKGROUND

1. Technical Field

The present invention relates to an electro-optical device, an electronic apparatus, a protective member, and a method of manufacturing a protective member.

2. Related Art

In recent years, the number of portable information communication apparatuses, such as cellular phones, personal digital assistants (PDAs), notebook computers, and the like, has increased markedly. Electro-optical devices, such as liquid crystal display devices and the like, have been widely used as display devices of these portable information communication apparatuses.

For simple portability, it is desirable that portable information communication apparatuses are small, light weight, shock resistance, and the like. Generally, in portable information communication apparatuses, one of the essential elements vulnerable to shock is an electro-optical device. Accordingly, in order to improve the shock resistance in electro-optical devices, a technology for installing a protective member in the electro-optical device has been disclosed in JP-A-2000-122037.

When an electro-optical device is mounted on a casing of a cellular phone, the electro-optical device is required to have water resistance or dust resistance, a small size, and shock resistance. This is applicable to a case in which the electro-optical device having the protective member disclosed in JP-A-2000-122037 is attached to a casing.

SUMMARY

An advantage of some aspects of the invention is that it provides an electro-optical device and a protective member, and a method of manufacturing the same, in which a decrease in the size of the device, improved water resistance or improved dust resistance, improved shock resistance, and improved visibility can be achieved.

Another advantage of some aspects of the invention is that it provides an electronic apparatus using the electro-optical device.

According to a first aspect of the invention, an electro-optical device includes an electro-optical panel that has a pair of substrates and an electro-optical layer interposed between the pair of substrates, a protective member composed of a light-transmitting substrate is mounted on at least one of the pair of substrates and protects the electro-optical panel, and a holding member that holds the electro-optical panel. The protective member has a thick portion where the thickness of the light-transmitting substrate is large, thin portions where the thickness of the light-transmitting substrate is small, the thin portions being provided at the outer circumference of the light-transmitting substrate, and step portions provided between the thick portion and the thin portions. The holding member has fitting portions that are fitted into (nested into) the step portions of the protective member. The light-transmitting substrate and the electro-optical panel are bonded to each other with an adhesive layer.

In the electro-optical device according to the first aspect of the invention, shock resistance, water-proof resistance or dust resistance may be provided to the liquid crystal panel in the electro-optical device by the protective member. Further, since the step portions are provided in the light-transmitting substrate to form the protective member, the holding member is fitted into the step, and the electro-optical panel having the protective member attached thereto can be integrated with the holding member. In this case, since a specific member does not need to be prepared so as to attach the electro-optical panel to the holding member, it is possible to prevent the size of the liquid crystal device from being increased due to attaching an electro-optical panel to the holding member, which leads to a decrease in the size of the electro-optical device. Further, since the protective member and the electro-optical panel can be bonded to each other, an air layer is not formed between the protective member and the electro-optical panel. As a result, the display visibility from the electro-optical panel can be markedly improved.

Preferably, the light-transmitting substrate of the protective member and the electro-optical device are bonded to each other with a hardening resin.

According to this structure, the protective member and the electro-optical panel can be directly bonded to each other. As such, the protective member and the electro-optical panel are bonded to each other, and an air layer is not formed between the protective member and the electro-optical panel. As a result, display visibility from the electro-optical panel can be markedly improved. Further, if the bonding between the protective member and the electro-optical panel is performed by using a hardening resin, it is possible to prevent a substrate gap (cell gap) of the electro-optical panel from being irregular.

Preferably, the fitting portions of the holding member are interposed between the electro-optical panel and the thin portions of the light-transmitting substrate and fitted into the step portions of the light-transmitting substrate, and the electro-optical panel is adhesively fixed on the principal plane at the side of the light-transmitting substrate having the step portions with the adhesive layer.

Preferably, the adhesive layer is provided between the fitting portions of the holding member and the electro-optical panel, such that the fitting portions of the holding member and the electro-optical panel are fixed. According to this structure, the electro-optical panel having the protective member attached thereto can be securely integrated with the holding member.

Preferably, the thin portions of the light-transmitting substrate are interposed between the electro-optical panel and the fitting portions of the holding member, the step portions of the light-transmitting substrate are fitted into the fitting portions of the holding member, and the electro-optical panel is adhesively fixed on the principal plane at the side opposite to the side of the light-transmitting substrate having the step portions with the adhesive layer. By fixing with the adhesive, the electro-optical panel having the protective member attached thereto can be securely integrated with the holding member.

Preferably, the protective member is constructed by overlapping a first light-transmitting substrate and a second light-transmitting substrate with each other, the second light-transmitting substrate has a smaller principal plane than the first light-transmitting substrate, the thin portions are formed at protruding portions of the first light-transmitting substrate that protrude relative to the outer circumference of the second light-transmitting substrate, the step portions are formed between the protruding portions and the outer circumference of the second light-transmitting substrate, and the fitting portions of the holding portion are disposed to correspond to the step portions.

In the electro-optical device according to the first aspect of the invention, shock resistance, water-proof resistance or dust resistance may be provided to the electro-optical panel in the electro-optical device by the protective member. Further, the protective member has the first light-transmitting substrate and the second light-transmitting substrate, and the second light-transmitting substrate of which an area of the principal plane (area of a plate plane) is relatively small is disposed such that it is included in a planar region of the first light-transmitting substrate. Further, the step portions are provided between the thin portion provided at the outer circumference of the protective member and the protruding portions (thin portions) of the first light-transmitting substrate and the second light-transmitting substrate at the outer circumference. Therefore, the end (fitting portion) of the holding member is fitted into the step portions of the protective member, and thus the electro-optical panel having the protective member attached thereto and the holding member can be integrated with each other. In this case, since a specific member does not need to be prepared so as to attach the protective member to the liquid crystal panel, it is possible to prevent the size of the electro-optical device from being increased due to attaching the protective member to the liquid crystal panel, which leads to a decrease in the size of the electro-optical device.

Preferably, the holding member is a casing that accommodates the electro-optical panel, the casing is provided with an opening corresponding to a display region of the electro-optical panel, ends of the opening of the holding member form the fitting portions, the thick portion of the light-transmitting substrate of the protective member is fitted into the opening of the holding member, and the step portions of the protective member engage with the fitting portions of the holding member. According to this structure, the electro-optical panel having the protective member attached thereto can be securely integrated with the holding member.

In the electro-optical device according to the first aspect of the invention, the holding member is formed of a hollow cylindrical body, and the electro-optical panel is held in the cylindrical body. The fitting portion of the holding member is formed in the cylindrical body, and thus the fitting portion of the holding member can be fitted into the step of the protective member. According to this structure, the electro-optical panel having the protective member attached thereto can be integrated with the holding member. Further, the fitting portion of the holding member can be constructed as a protrusion that protrudes to the inner side of the cylindrical body, and the protrusion can be fitted into the step of the protective member.

According to this structure, the electro-optical panel can be suspended in the hollow inner portion of the holding member (supported and fixed by fixing the electro-optical panel to the light-transmitting substrate disposed at the upper side by using the adhesive). As such, the electro-optical panel is suspended, and thus shock resistance can be improved. The suspension means that the electro-optical panel is not supported from the lower side of the vertical direction.

Preferably, the adhesive layer is interposed between the fitting portions of the holding member and the thin portions of the protective member, such that the protective member and the holding member are fixed.

Preferably, the first light-transmitting substrate and the second light-transmitting substrate are bonded to each other, the first light-transmitting substrate is attached to the electro-optical panel, and the second light-transmitting substrate is disposed on a side opposite to the electro-optical panel with respect to the first light-transmitting substrate.

The protective member has a first light-transmitting substrate that is attached to the electro-optical panel, and a second light-transmitting substrate that is attached to the first light-transmitting substrate. The thin portion having the step is formed at the outer circumference of the first light-transmitting substrate, and the second light-transmitting substrate is disposed at the side opposite to the electro-optical panel with respect to the first light-transmitting substrate, and the fitting portion of the holding member (end of the opening) can be interposed between the step of the first light-transmitting substrate and the second light-transmitting substrate. According to this structure, the electro-optical panel having the protective member attached thereto can be securely integrated with the holding member.

Preferably, the first light-transmitting substrate and the second light-transmitting substrate are bonded to each other, the second light-transmitting substrate is attached to the electro-optical panel, and the first light-transmitting substrate is disposed on a side opposite to the electro-optical panel with respect to the second light-transmitting substrate.

In the electro-optical device according to the first aspect of the invention, the adhesive layer is interposed between the fitting portion of the holding member (end of the opening) and the thin portion of the protective member where the first light-transmitting substrate protrudes from the outer circumference of the second light-transmitting substrate of the protective member, the protective member and the casing are fixed, and the electro-optical panel is adhesively fixed to the protective member on the top surface of the electro-optical panel with the protective member interposed therebetween.

The electro-optical panel is adhesively fixed, and the electro-optical panel having the protective member attached thereto can be integrated with the protective member. Further, the fitting portion of the holding member (end of the opening) is interposed between the thin portion where the first light-transmitting substrate protrudes with the step from the outer circumference of the second light-transmitting substrate of the protective member and the electro-optical panel. As a result, the adhesive layer is interposed between the second light-transmitting substrate and the electro-optical panel, and between the end of the opening of the holding member and the electro-optical panel so as to be fixed. According to this structure, the electro-optical panel having the protective member attached thereto and the holding member can be securely integrated with each other.

Preferably, the one of the first light-transmitting substrate and the second light-transmitting substrate that is disposed on the side of the electro-optical panel is made of tempered glass. By using the tempered glass substrate, a light-transmitting property of the protective member can be improved, and a degree of freedom at the time of design can be increased, which leads to improving visibility of the electro-optical panel.

Preferably, the one of the first light-transmitting substrate and the second light-transmitting substrate that is disposed on a side opposite to the side of the electro-optical panel is made of a resin. As such, the resin substrate is used as the substrate disposed at the side opposite to the side of the electro-optical panel (side of the display surface), and thus it is possible to surely prevent the protective member from being damaged, as compared with a glass substrate.

Preferably, at least one of the first light-transmitting substrate and the second light-transmitting substrate is a polarizer that allows polarized light to be incident on the electro-optical panel. As such, if the polarizer is an element of the protective member, a separate polarizer does not need to be attached to the electro-optical panel.

Preferably, in a region of the fitting portions of the holding member into which the thin portions of the light-transmitting substrate are fitted, light-shielding members of a predetermined pattern are disposed. According to this structure, a light-shielding property or fanciness (decoration by a predetermined light-shielding pattern) may be applied to a predetermined region of the display device by the light-shielding member. In particular, the light-shielding member shields light from the non-display portion of the electro-optical panel, which leads to improving display visibility.

In particular, the light-shielding member is formed so as to cover the step in plan view. Meanwhile, the electro-optical panel and the light-transmitting substrate may align with each other such that the light-shielding member is located in the non-display region of the electro-optical panel in plan view. As such, if the step of the light-shielding substrate and the non-display region of the electro-optical panel are shielded from the light, display visibility is improved.

When the light-shielding members having predetermined patterns are disposed in at least one of the first light-transmitting substrate and the second light-transmitting substrate, the light-shielding films are formed to cover the step portions in plan view. Meanwhile, the electro-optical panel and the protective member may align with each other such that the light-shielding member overlaps the non-display region of the electro-optical panel in plan view to be located therein. As such, if the thin portions of the protective member and the non-display region of the electro-optical panel are shielded from the light, the display visibility can be improved.

Further, the light-shielding member not only has a complete light-shielding property that completely shields light (display) from the electro-optical panel, but also a semi-light-shielding property that shields a portion of the light from the electro-optical panel. Alternatively, the light-shielding member has a black light-shielding member, and colored members that are colored with predetermined colors (for example, red, blue, green, and the like).

According to a second aspect of the invention, an electronic apparatus includes the above-mentioned electro-optical device. The electro-optical device having the protective member attached thereto can be constructed as a display portion of the electronic apparatus. In addition, preferably, the electronic apparatus that has the electro-optical device has high shock resistance. This electronic apparatus is suitable for portable information communication apparatuses, such as a cellular phone, a pager, a PDA, a portable information communication terminal, and the like. In this case, if the electro-optical panel is held by using the casing of the electronic apparatus as the holding member, the structure can be further simplified.

According to a third aspect of the invention, a protective member includes a light-transmitting substrate for protecting a surface of an electro-optical panel. Further, step portions are provided at the outer circumference of the light-transmitting substrate so as to provide portions whose thickness is selectively reduced.

According to this structure, the protective member can protect the electro-optical panel from a shock or the like and the protective member includes a light-transmitting glass substrate with a step portion formed at the outer circumference. Therefore, in the step, the protective member can be fixed to the casing or the like. Accordingly, when the electro-optical device having the protective member attached thereto is fixed to the casing or the like, water resistance or dust resistance can be improved in the electro-optical panel. Further, since a specific member does not need to be prepared so as to attach the electron optical panel having the protective member attached thereto to the casing, it is possible to prevent the size of the liquid crystal device from being increased due to attaching an electro-optical panel to the casing, which leads to a decrease in the size of the liquid crystal device. Further, since the protective member includes a glass substrate, it has an improved light-transmitting property and a high degree of freedom at the time of design, which leads to improving visibility of the electro-optical panel.

Preferably, in the light-transmitting substrate, light-shielding members that shield a predetermined region of the electro-optical panel are formed. The light-shielding member is formed, and thus the visibility of the electro-optical panel can be further improved. Preferably, the light-shielding members are formed in a region that covers at least the step portions in plan view. In this case, it is possible to reliably shield light from the casing fixed to the step, and the visibility of the electro-optical panel can be further improved.

According to a fourth aspect of the invention, there is provided a method of manufacturing a protective member that includes a light-transmitting substrate for protecting a surface of an electro-optical panel. The method includes performing mask etching on a light-transmitting substrate to form thin portions with step portions provided at the outer circumference of the light-transmitting substrate.

According to this structure, the protective member can be appropriately manufactured. Since the protective member includes a light-transmitting glass substrate, the step portions can be easily formed at the outer circumference of the glass substrate by etching using a mask.

According to a fifth aspect of the invention, there is provided a method of manufacturing a protective member that includes a light-transmitting substrate for protecting a surface of an electro-optical panel. The method includes forming thin portions with step portions provided at locations corresponding to the outer circumference of each of a plurality of protective members by performing mask etching on a large-sized light-transmitting mother substrate capable of forming the plurality of protective members, and cutting the light-transmitting mother substrate at the thin portions so as to divide the light-transmitting mother substrate into the plurality of protective members.

According to this structure, the protective member can be appropriately manufactured. In particular, the light-transmitting substrate of the protective member includes a glass substrate and an etching process is performed using a mask. As a result, the step can be easily formed at the outer circumference of the glass substrate. Further, a glass mother substrate is used as a large-sized light-transmitting mother substrate, and the thin portion having the step is collectively formed for each protective member by etching using a mask. This allows the manufacture efficiency can be markedly improved. As a result, a protective member of a low cost can be provided.

Preferably, the method of manufacturing a protective member further includes, after the forming of the step portions, forming light-shielding members of predetermined patterns. Similarly, the method of manufacturing a plurality of protective members preferably further includes, after the cutting of the light-transmitting mother substrate, forming light-shielding members of predetermined patterns. Preferably, in the forming of the light-shielding members, the light-shielding members are formed by a printing method. The light-shielding members can be formed at a location that overlaps the step in plan view so as to cover at least the step at the rear surface side of the substrate. Further, as a finishing process, a substrate polishing process or a chemical enhancing process may be performed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
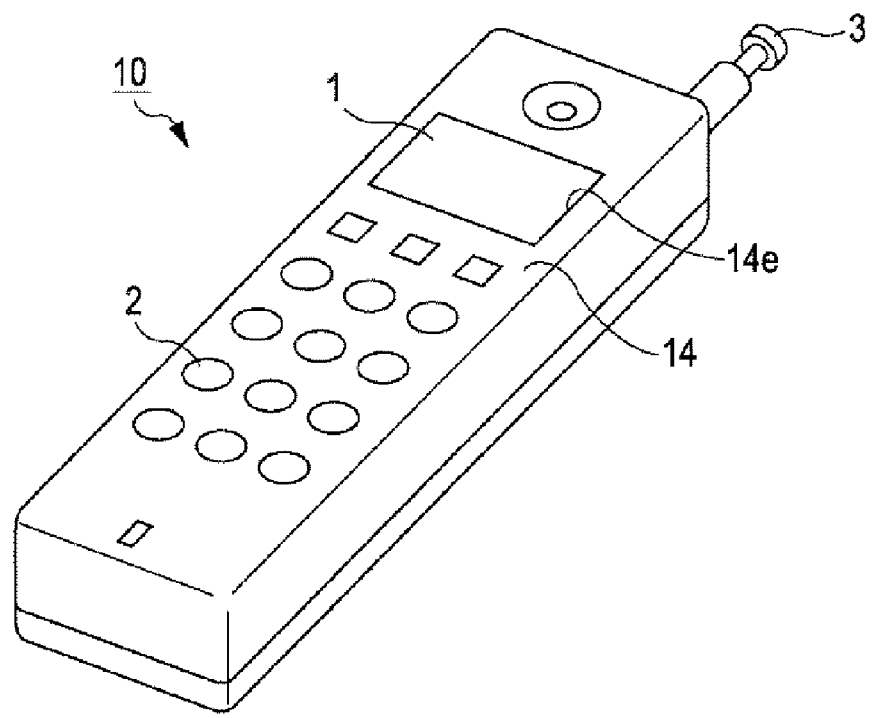
FIG. 1 is a perspective view schematically illustrating an entire structure of a cellular phone.

Hereinafter, preferred embodiments of the invention will be described in detail with reference to the accompanying drawings. The scale of each layer or member has been adjusted in order to have a recognizable size in the drawings.

First Embodiment

Figure 2:
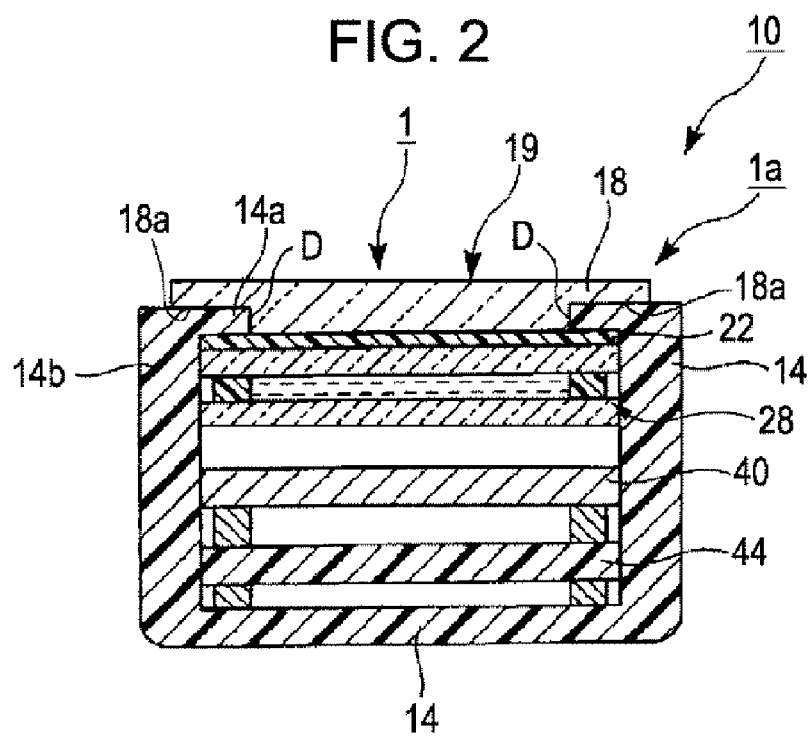
FIG. 2 is a cross-sectional view schematically illustrating a sectional structure of a peripheral portion of a display portion of a cellular phone.
Figure 3:
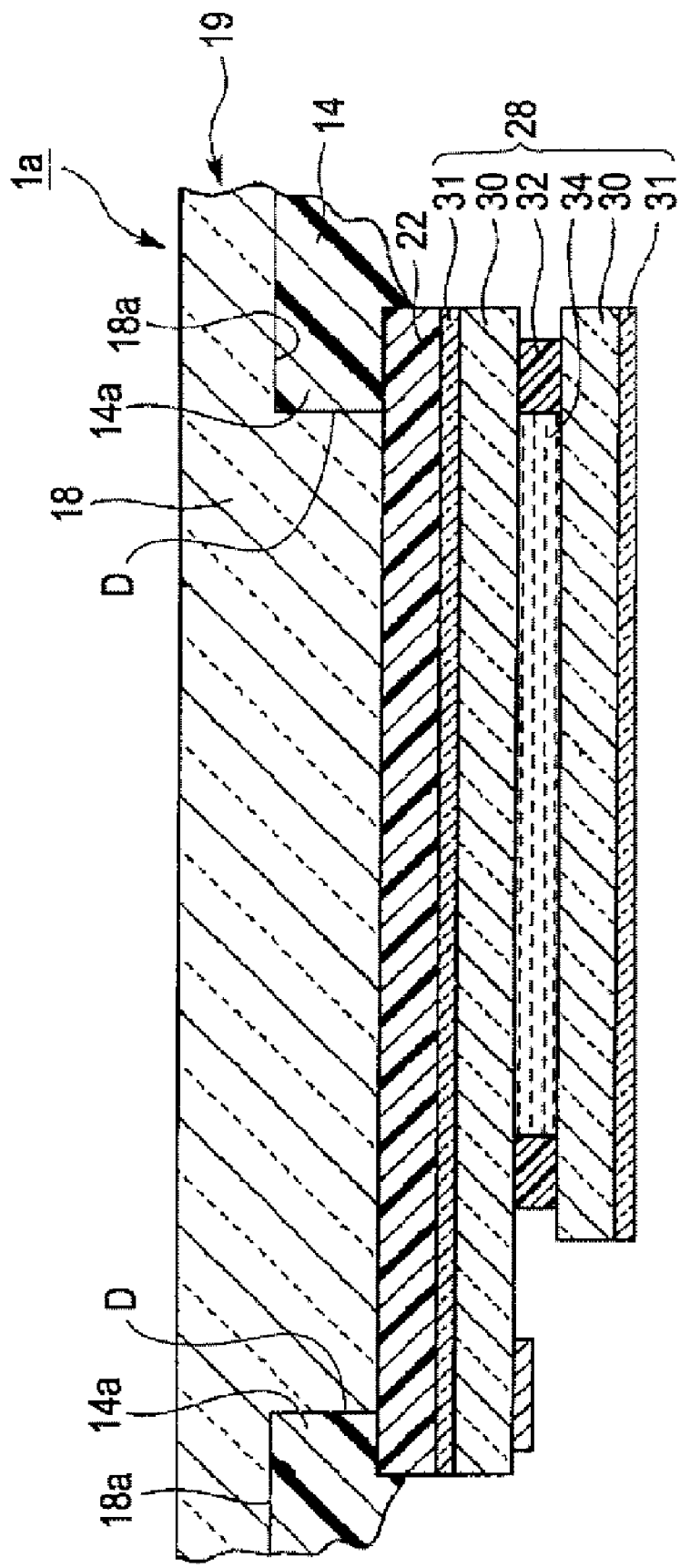
FIG. 3 is a cross-sectional view schematically illustrating a sectional structure of a display device included in a display portion.

FIG. 1 is a perspective view schematically illustrating an entire structure of a cellular phone 10 that is an electronic apparatus according to a first embodiment of the invention. FIG. 2 is a cross-sectional view schematically illustrating a sectional structure of a peripheral portion of a display portion of a cellular phone 10. FIG. 3 is a cross-sectional view schematically illustrating a sectional structure of a display device (electro-optical device) that is included in the cellular phone 10.

As shown in FIG. 1, the electronic apparatus 10 according to the first embodiment includes a plastic casing 14, a display portion 1 that is exposed through an opening of the casing 14 to face the outside, an operation portion 2 (operation buttons), and an antenna 3. The display portion 1 has a sectional structure shown in FIG. 2. The display portion 1 includes, a display device 1a (electro-optical device) that is exposed through a display window 14e (opening) (see FIG. 1) of the casing 14 to face the outside, and a backlight 40 that is installed in the casing 14. The backlight 40 is held in the casing 14 within a predetermined circuit board 44.

The display device 1a includes a liquid crystal device in this embodiment, and includes a liquid crystal panel 28 (electro-optical panel), a protective member 19, and an adhesive layer 22 for attaching the protective member 19 to the liquid crystal panel 28. In this case, the display device 1a is fixed to an inner side of the cylindrical casing 14 (holding member) of the cellular phone 10, and integrated with the casing 14 having a structure in which the ends 14a of the casing 14 are interposed between the protective member 19 and the adhesive layer 22.

As shown in FIG. 3, the liquid crystal panel 28 has two transparent substrates 30, each of which has a polarizer 31, a sealant 32 that seals the peripheral regions of the two transparent substrates 30, and liquid crystal 34 (electro-optical material) that is interposed in a space between the transparent substrates 30. Each of the two substrates 30 is formed of glass or plastic.

Examples of the liquid crystal panel 28 according to a driving method may include a simple-matrix-driven liquid crystal display panel or a static-driven liquid crystal display panel in which switching elements are not used in the panel, an active-matrix-driven liquid crystal display panel that uses a three-terminal switching element represented by a thin-film transistor (TFT) or a two-terminal switching element represented by MIM, and the like. In addition, examples of the liquid crystal panel 28 according to an electro-optical characteristic may include various types of liquid crystal panels, such as a TN-type liquid crystal panel, an STN-type liquid crystal panel, a quest-host-type liquid crystal panel, a phase-transition type liquid crystal panel, a ferroelectric liquid crystal panel, and the like.

The protective member 19 is attached to the liquid crystal panel 28 with the adhesive layer 22 interposed therebetween. The protective member 19 is formed of an acrylic resin and sufficiently transmits visible light. The protective member 19 includes a light-transmitting substrate 18 that has the thickness within a range of 1 to 2 mm, and has a high shock resistance to cope with any shocks the cellular phone may incur in case the cellular phone is dropped. Further, the light-transmitting substrate 18 has thin portions 18a formed to define step portions D (groove or notch portions) formed by cutting portions of the outer circumference of the principal plane. When a thick portion of the light-transmitting substrate 18 is adjacent to the adhesive layer 22 (that is, proximate the liquid crystal layer 28), the light-transmitting substrate 18 and the liquid crystal panel 28 are bonded to each other. Accordingly, portions that thinly protrude to the outside of the light-transmitting substrate 18 form thin portions 18a. That is, the light-transmitting substrate 18 has a relatively thick portion at the center of the light-transmitting substrate 18, relatively thin portions 18a along the outer circumference of the light-transmitting substrate 18, and step portions D between the thick portion and the thin portions. The ends 14a (fitting portions) of the casing 14 are fitted into (nest within) the step portions D.

Further, with the step portions D formed, spaces opening toward the outside in the step portion D are formed at the bonding interface between the light-transmitting substrate 18 and the adhesive layer 22 (that is, at the liquid crystal panel 28), and portions of the casing 14 of the cellular phone 10 are fitted into these spaces. In this case, the ends 14a (fitting portions) of the opening of the casing 14 are fitted into the spaces, and thus the casing 14 and the display device 1a are integrated with each other. The end 14a of the opening of the casing 14 is constructed as a protrusion that protrudes from a main body 14b of the cylindrical casing 14.

Meanwhile, the depth of the step portion D (height or distance between the bonding interface between the light-transmitting substrate 18 and the liquid crystal panel 28, and a surface of a thin portion 18a of the light-transmitting substrate having a small thickness) is designed according to the thickness of the end 14a of the opening of the casing 14. In this embodiment, the depth of the step portion D is designed to be equal to the thickness of the end 14a of the opening of the casing 14. As a result, the rear surface of the end 14a of the opening of the casing 14 (holding member) (the surface opposite to the thin portion of the light-transmitting substrate) are planarized to align with each other, and each of them comes into contact with the adhesive layer 22. Further, the light-transmitting substrate 18 may be formed of not only an acrylic resin but also a urethane resin or an epoxy resin, or a glass.

The adhesive layer 22 that bonds the liquid crystal panel 28 and the protective member 19 is made of a transparent elastic resin that is formed over the entire display surface of the liquid crystal panel 28. In this case, the transparent elastic resin has a thermosetting property, as in a silicone resin, such as silicone gel and the like, an acrylic resin, a urethane resin, and the like, has elasticity after a thermosetting treatment, and sufficiently transmits visible light, and it is formed at a thickness of about 30 μm.

The transparent elastic resin that forms the adhesive layer 22 has viscosity, and can adhere to the polarizer 31 of the liquid crystal panel 28 and the light-transmitting substrate 18 of the protective member 19 by means of adhesion. Further, the transparent elastic resin is advantageous in that it can firmly adhere to the liquid crystal panel 28 and the light-transmitting substrate 18 by a thermosetting treatment without using an adhesive. The transparent elastic resin holds predetermined elasticity even after the thermosetting treatment. As such, since the transparent elastic resin has viscosity, it can hold the protective member 19 and the liquid crystal panel 28 in an adhesion state without using adhesive.

In the cellular phone 10 according to this embodiment, since the display device 1a forming a display portion 1 includes a liquid crystal device in which the surface of the liquid crystal panel 28 is covered by the protective member 19, it has improved shock resistance, and the liquid crystal panel 28 can be prevented from being damaged due to a shock generated if it is dropped. Further, in addition to the shock resistance, water resistance or dust resistance may be imparted to the liquid crystal panel 28.

Further, since the step portion D is provided in the light-transmitting substrate 18 to form the protective member 19, the protective member 19 and the liquid crystal panel 28 are bonded to each other with the adhesive layer 22 interposed therebetween, and thus a space corresponding to the thin portion 18a of the light-transmitting substrate 18 is formed between the protective member 19 (light-transmitting substrate 18) and the adhesive layer 22 at the bonding interface. In addition, the end 14a (fitting portion) of the opening of the casing 14 that serves as the holding member is fitted into the space so as to correspond to the thin portion 18a, and thus the liquid crystal panel 28 having the protective member attached thereto and the casing 14 can be integrated with each other. In this case, since a specific member does not need to be prepared so as to attach the liquid crystal panel 28 to the casing 14, it is possible to prevent the size of the liquid crystal device 1a from being increased due to the attachment of the liquid crystal panel 28 to the casing 14, which leads to a decrease in the size of the liquid crystal device 1a. Further, since the protective member 19 and the liquid crystal panel 28 are directly bonded to each other, an air layer is not formed between the protective member 19 and the liquid crystal panel 28. As a result, the display visibility from the liquid crystal panel 28 can be markedly improved.

In this embodiment, the casing 14 is formed of a hollow cylindrical body, and the liquid crystal panel 28 is held in the cylindrical body. Further, when the protrusion-shaped end 14a that is formed in the cylindrical body is fitted into the step portion D of the light-transmitting substrate 18, the end 14a is interposed between the thin portion 18a of the light-transmitting substrate 18 and the adhesive layer 22. By using this structure, the liquid crystal panel 28 having the protective member attached thereto can be securely integrated with the casing 14, and since the casing 14 is covered with the protective member 19, the strength of the display device 1a can be further increased.

Figure 21A:
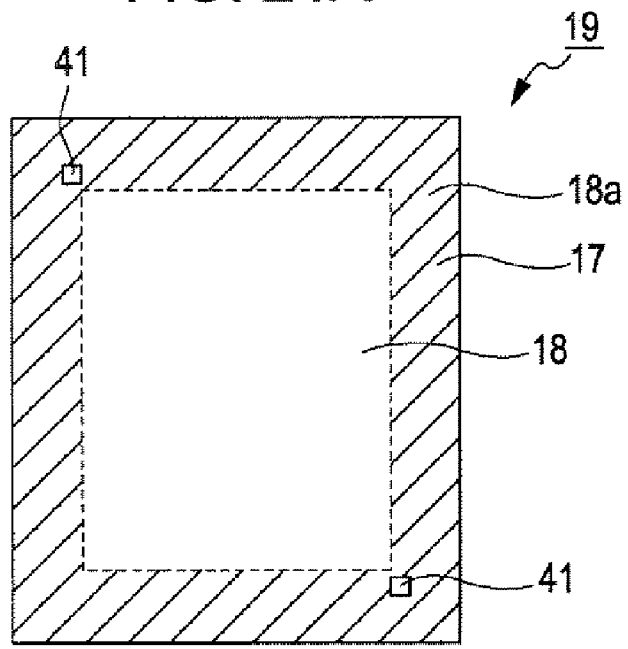
FIGS. 21A and 21B are diagrams illustrating a modification of alignment between a liquid crystal panel and a protective member.
Figure 21B:
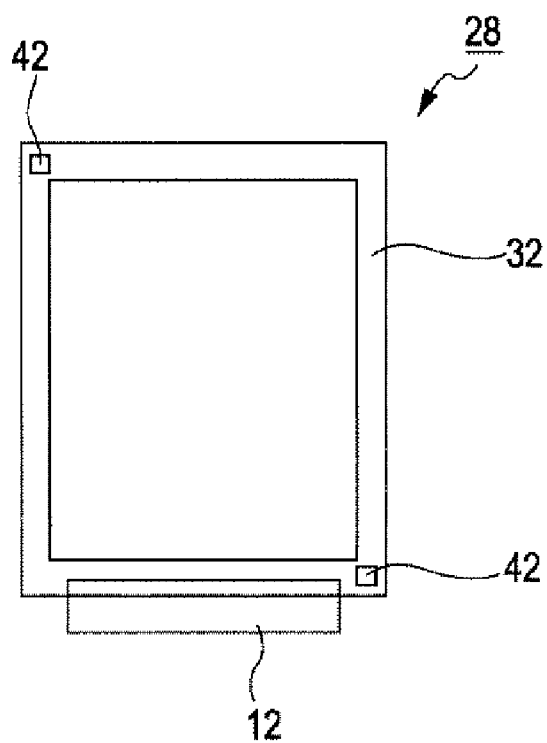

In this embodiment, the protective member 19 and the liquid crystal panel 28 align with each other, such that the thin portion 18a of the light-transmitting substrate 18 covers the outer circumference of the liquid crystal panel 28, that is, such that the thin portion 18a of the light-transmitting substrate 18 covers sealant 32. Specifically, as shown in FIGS. 21A and 21B, the alignment between the protective member 19 and the liquid crystal panel 28 is performed by making an alignment mark 41 formed at a location overlapping the thin portion 18a of the protective member 19 overlap an alignment mark 42 formed at a location overlapping the sealant 32 of the liquid crystal panel 28. Further, after the alignment between the protective member 19 and the liquid crystal panel 28, a circuit board 12 that has external connection terminals of the liquid crystal panel 28 is exposed through the protective member 19 so as to face the outside.

Second Embodiment

Hereinafter, a display device according to a second embodiment of the invention that forms a display portion 1 of a cellular phone 10 will be described.

Figure 4:
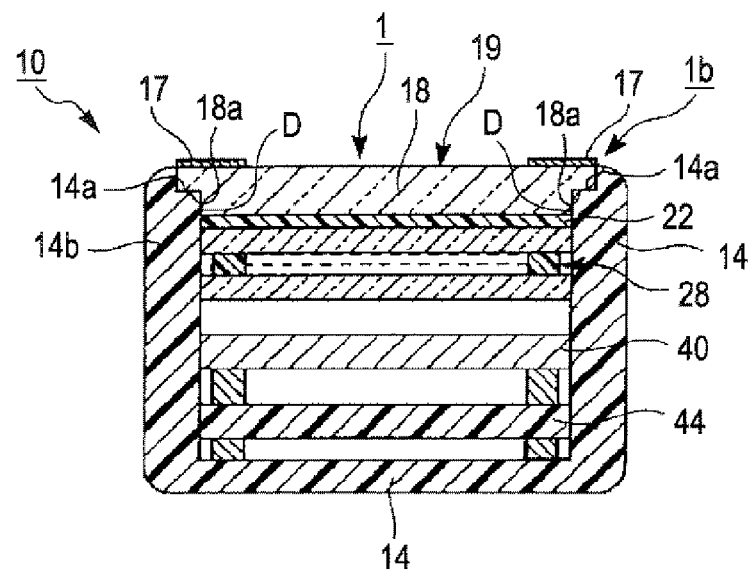
FIG. 4 is a cross-sectional view schematically illustrating a sectional structure of a display portion in which a display device according to a second embodiment is installed in a casing.

FIG. 4 is a diagram schematically illustrating a sectional structure of a display device 1b according to the second embodiment of the invention, which corresponds to FIG. 2 illustrating the display device 1a according to the first embodiment of the invention. In this case, the display device 1b according to the second embodiment of the invention illustrated in FIG. 4 is different from the display device 1a according to the first embodiment illustrated in FIGS. 2 and 3 in the structures of the protective member 19 and the casing 14 and the fitting aspect between the protective member 19 and the casing 14. The adhesive layer 22 and the liquid crystal panel 28 in the liquid crystal device 1b illustrated in FIG. 4 have the same structures as those in the liquid crystal device 1a illustrated in FIGS. 2 and 3. Therefore, in order to avoid a repetitive description, only the protective member 19 and the casing 14 will be described.

Even in the second embodiment, the step portions D and the thin portions 18a are formed in the light-transmitting substrate 18 of the holding member 19, and the thick portion of the protective member 19 is attached to the liquid crystal panel 28 with the adhesive layer 22 interposed therebetween. In addition, the casing 14 is also provided with step portions so as to engage with the step portions D provided in the light-transmitting substrate 18 of the holding member 19. The step portion 18a and the step 14a (fitting portion) are complimentary of one another, such that they engage with each other. Accordingly, in the second embodiment, the fitting portion 14a of the casing 14 (holding member) forms a step, and the fitting portion of the casing 14 (holding member) does not protrude to an inner side of the casing that accommodates the liquid crystal panel 28.

Further, in the second embodiment, light-shielding members 17 are formed on the protective member 19. Each light-shielding member 17 is patterned in such a manner that it overlaps the step portion D and the thin portion 18a of the light-transmitting substrate 18 in plan view. Further, the light-shielding member 17 aligns in such a manner that it overlaps the sealant 32 of the liquid crystal panel 28 (see FIG. 3).

Specifically, as shown in FIGS. 21A and 21B, the alignment is performed by making an alignment mark 41 formed at a location overlapping the step portion D of the protective member 19 and the thin portion 18a of the light-transmitting substrate 18 overlap an alignment mark 42 formed at a location overlapping the sealant 32 of the liquid crystal panel 28. Further, as shown in FIGS. 21A and 21B, the light-shielding member 17 is formed to overlap the step portion D and the thin portion 18a of the light-transmitting substrate 18 in plan view. Further, the light-shielding member 17 aligns such that it surrounds the display region of the liquid crystal panel 28.

Even in the display device 1b according to the second embodiment having the above-mentioned structure, the shock resistance, the water resistance, and the dust resistance may be provided to the liquid crystal panel 28 in the display device 1b by the protective member 19. Further, since the protective member 19 includes a light-transmitting substrate 18, it has an excellent light-transmitting property. In the protective member, a degree of freedom in design is high, which leads to improving visibility of the liquid crystal panel 28.

Furthermore, since the light-shielding member 17 is formed to surround the display region of the liquid crystal panel 28, a light-shielding property or fanciness (decoration by a predetermined light-shielding pattern) may be applied to a predetermined region of the display device by the light-shielding member 17, thereby improving visibility of the display.

Further, the light-shielding member 17 is not limited to having a complete light-shielding property that completely shields light (display) from the liquid crystal panel 28, but also may have a semi-light-shielding property that shields a portion of the light from the liquid crystal panel 28. Alternatively, the light-shielding member 17 may have a black light-shielding member, and colored members that are colored with predetermined colors (for example, red, blue, green, and the like). The light-shielding member 17 is preferably made of a material of a chromium metal, but this embodiment is not limited thereto. That is, the light-shielding member 17 may be made of a material, such as a resin black obtained by dispersing carbon or titanate in a photoresist, or a metal material, such as nickel and the like. Alternatively, for low reflection, the lights shielding member 17 may have a two-layered structure that has a chromium metal film and chromium oxide film.

Third Embodiment

Figure 5:
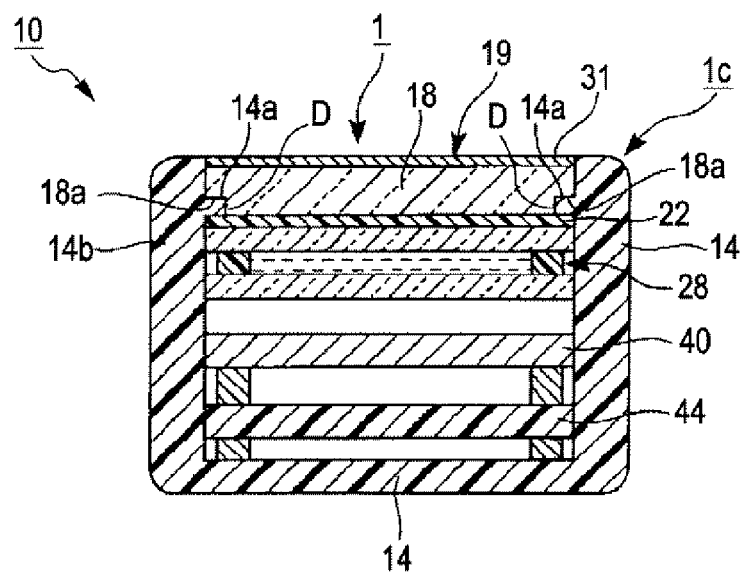
FIG. 5 is a cross-sectional view schematically illustrating a sectional structure of a display portion in which a display device according to a third embodiment is installed in a casing.

Hereinafter, a display device according to a third embodiment of the invention that forms a display portion 1 of a cellular phone 10 will be described. FIG. 5 is a diagram schematically illustrating a sectional structure of a display device 1c according to the third embodiment of the invention, which corresponds to FIG. 2 illustrating the display device 1a according to the first embodiment of the invention.

Even in the third embodiment, the step portions D and the thin portions 18a are formed in the light-transmitting substrate 18 of the holding member 19, and the protective member 19 is attached to the liquid crystal panel 28. In addition, in the casing 14, protrusions 14a (fitting portions) that protrude from an inner surface of the casing 14 are formed. When the protrusions 14a (fitting portions) are interposed between the thin portion 18a of the light-transmitting substrate 18 and the adhesive layer 22, the protrusions 14a (fitting portions) are fitted into the step portions D of the light-transmitting substrate 18. In this embodiment, the protrusions 14a are fitted into the step portions D of the light-transmitting substrate 15, so that the casing 14 can be integrated with the liquid crystal panel 28 having the protective member attached thereto.

Further, in the third embodiment, the polarizer 31 is disposed on the display surface side of the protective member 19 (that is, the surface which is spaced apart from the adhesive layer 22), and accommodated in the opening of the casing 14. The polarizer 31 makes linearly polarized light incident on the liquid crystal panel 28. In this embodiment, a polarizer is not provided on the display surface side of the liquid crystal panel 28 (that is, the surface along the adhesive layer 22).

Even in the display device 1c according to the third embodiment having the above-mentioned structure, the shock resistance, the water resistance, and the dust resistance may be provided to the liquid crystal panel 28 in the display device 1c by the protective member 19. Further, since the protective member 19 includes a light-transmitting substrate 19, it has an excellent light-transmitting property. In the protective member, a degree of freedom in design is high, which leads to improving the visibility of the liquid crystal panel 28. In the third embodiment, since the polarizer 31 is formed on an outer surface of the protective member 19, it is possible to prevent glass splash from occurring.

Fourth Embodiment

Figure 6:
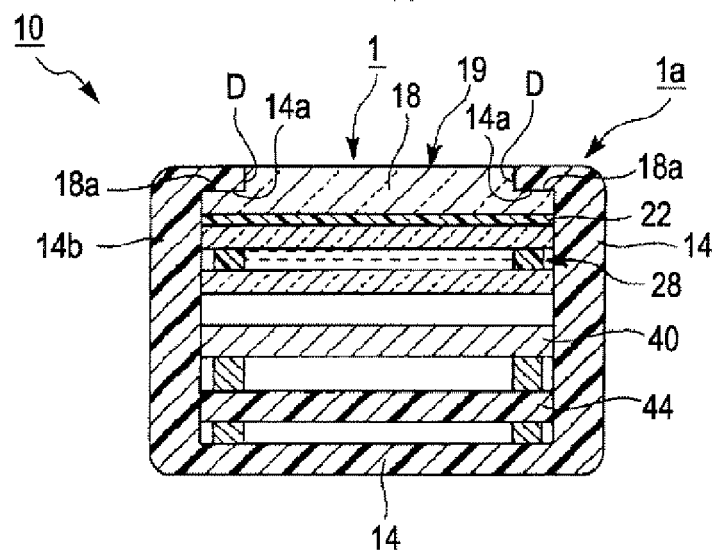
FIG. 6 is a cross-sectional view schematically illustrating a sectional structure of a peripheral portion of a display portion of a cellular phone.
Figure 7:
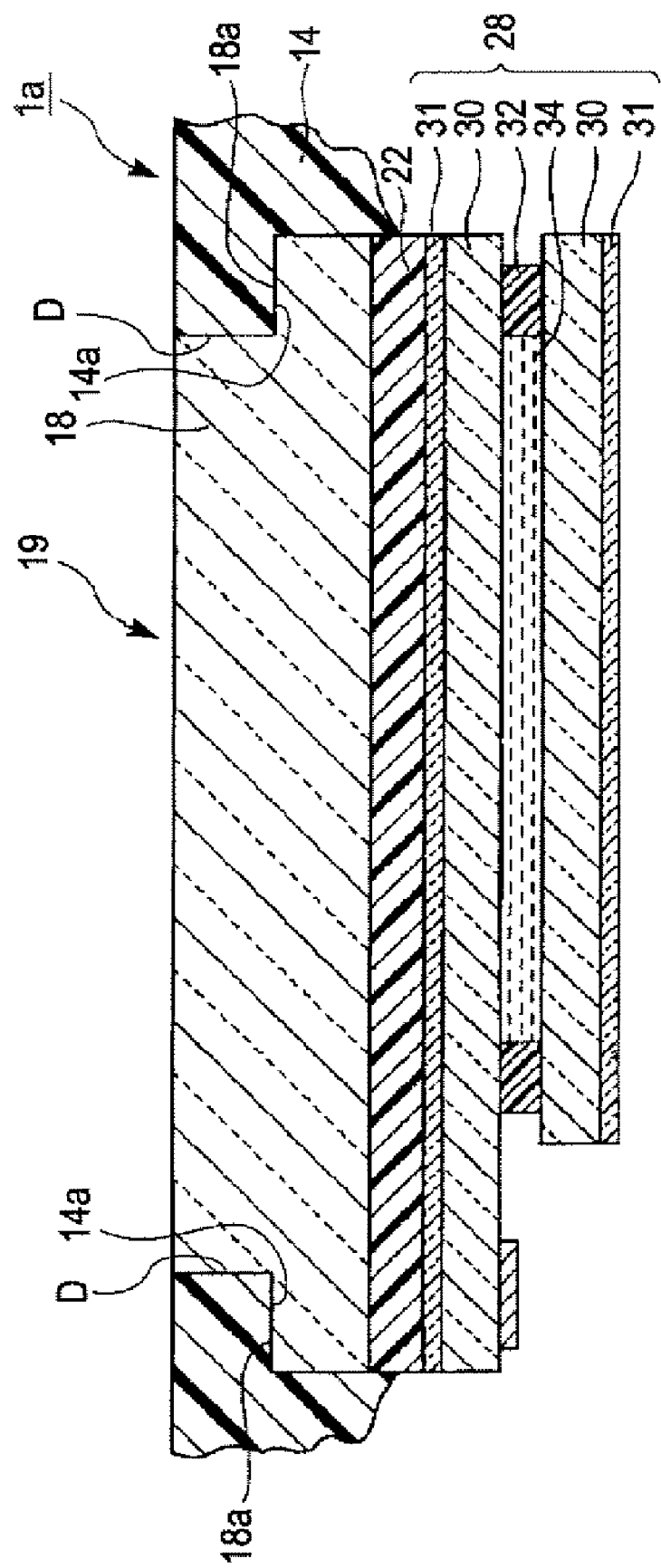
FIG. 7 is a cross-sectional view schematically illustrating a sectional structure of a display device included in a display portion.

FIG. 6 is a cross-sectional view schematically illustrating a sectional structure of a peripheral portion of a display portion of a cellular phone 10, and FIG. 7 is a cross-sectional view schematically illustrating a sectional structure of a display device (electro-optical device) that is included in the cellular phone 10.

In the fourth embodiment, the display device 1a includes a liquid crystal device, and includes a liquid crystal panel 28 (electro-optical device), a protective member 19, and an adhesive layer 22 that attaches the protective member 19 to the liquid crystal panel 28. In this case, the display device 1a is fixed to an inner side of a cylindrical casing 14 (holding member) of the cellular phone 10, and then integrated with the casing 14.

As shown in FIG. 7, the liquid crystal panel 28 includes two transparent substrates 30, polarizers 31 that are respectively attached to the two transparent substrates 30, a sealant 32 that seals a peripheral region of the substrates, and liquid crystal 34 (electro-optical layer) that is sealed in a space between the substrates 30. Each of the two substrates 30 is made of glass or plastic.

Further, the protective member 19 is attached to the liquid crystal panel 28 with an adhesive layer 22 interposed therebetween. The protective member 19 is formed of a light-transmitting glass substrate, and sufficiently transmits visible light. The protective member 19 has the thickness within a range of 1 to 2 mm, and has strength against a shock or the like due to the cellular phone being dropped. Further, the light-transmitting substrate 18 has thin portions 18a and step portions D (groove or notch portions) formed by cutting portions of the outer circumference of the principal plane of the substrate 18 using etching. The light-transmitting substrate 18 and the liquid crystal panel 28 are bonded to each other in such a manner that a display surface opposite to the mounting surface where the step portions D and the thin portions 18a of the light-transmitting substrates 18 are formed is opposite to (spaced apart from) the adhesive layer 22 (that is, spaced apart from the liquid crystal panel 29).

In order to correspond to the step portion D and the thin portion 18a of the light-transmitting substrate 19, a fitting portion 14a is formed in the casing 14 of the cellular phone 10. In this case, the fitting portion 14a is constructed as a protrusion 14a that protrudes from a main body 14b of the cylindrical casing 14. In addition, the protrusion 14a is fitted into (nested within) the step portion D of the light-transmitting substrate 19, and thus the casing 14 and the display device 1a are integrated with each other. Further, the casing 14 is formed of a hollow cylindrical body, and it is held in a state in which the liquid crystal panel 28 is suspended in a cylindrical body (that is, a state in which it is adhesively fixed on only a mounting surface of the protective member 19 that includes the thin portions 18a), and a protrusion 14a (fitting portion) that protrudes from an inner surface of the cylindrical body is fitted into the step portion D of the light-transmitting substrate 18.

Meanwhile, the depth of the step portion D is designed according to a size of the protrusion 14a (fitting portion). In this embodiment, the depth of the step portion D is designed to be equal to the thickness of the protrusion 14a in size. Specifically, the thickness of the protrusion 14a is within a range of 0.2 to 0.8 mm (for example, 0.4 mm), and the step portion D is constructed such that its depth is equal to the thickness of the protrusion 14a in size. As a result, an exterior surface of the protrusion 14a (the surface spaced apart from the thin portion 18a of the light-transmitting substrate 18) and an upper surface of the light-transmitting substrate 18 (the surface of the thick portion of the light-transmitting substrate 18 spaced apart from the liquid crystal panel 28) are planarized (made flush) to align with each other, and thus the sleekness of the cellular phone 10 is improved. Further, in the transparent substrate 18, the step portion D, the thin portion 18a, and the light-shielding member that shields light from the non-display region of the liquid crystal panel 28 may be provided.

The adhesive layer 22 that bonds the liquid crystal panel 28 to the protective member 19 is made of a transparent elastic resin that is formed over an entire display surface of the liquid crystal panel 28. In this case, the transparent elastic resin has a thermosetting property, as in a silicon resin, such as silicon gel and the like, an acrylic resin, a urethane resin, and the like, holds elasticity after the thermosetting resin, and sufficiently transmits visible light, and it is formed at the thickness of about 30 μm.

The transparent elastic resin that forms the adhesive layer 22 has viscosity, and can adhere to the polarizer 31 of the liquid crystal panel 28 and the light-transmitting substrate 18 of the protective member 19 by means of adhesion. Further, the transparent elastic resin is advantageous in that it can firmly adhere to the liquid crystal panel 28 and the light-transmitting substrate 18 by the thermosetting treatment without using an adhesive. The transparent elastic resin holds predetermined elasticity after the thermosetting treatment. As such, since the transparent elastic resin has adhesion, it can hold an adhesion state between the protective member 19 and the liquid crystal panel 28 without using a separate adhesive or the like.

In the cellular phone 10 according to the fourth embodiment having the above-mentioned configuration, since the display device 1a that forms the display portion 1 includes a liquid crystal device in which a surface of the liquid crystal panel 28 is covered with the protective member 19, it has improved shock resistance, and the liquid crystal panel 28 can be prevented from being damaged due to a shock generated in the case of being dropped. Further, in addition to the shock resistance, water resistance or dust resistance may be provided to the liquid crystal panel 28. Further, since the protective member 19 includes a light-transmitting substrate 18, it has an excellent light-transmitting property. In the protective member, a degree of freedom in design is high, which leads to improving visibility of the liquid crystal panel 28.

Further, in the fourth embodiment, the protective member 19 and the liquid crystal panel 28 align with each other such that the thin portion 18a of the light-transmitting substrate 18 overlaps the outer circumference of the liquid crystal panel 28, that is, such that the thin portion 18a of the light-transmitting substrate 18 overlaps the sealant 32. Specifically, as shown in FIGS. 21A and 21B, the alignment between the protective member 19 and the liquid crystal panel 28 is performed by making an alignment mark 41 formed at a location overlapping the thin portion 18a of the light-transmitting substrate 18 of the protective member 19 overlap an alignment mark 42 formed at a location overlapping the sealant 32 of the liquid crystal panel 28. Further, after the alignment between the protective member 19 and the liquid crystal panel 28, a circuit board 12 that has external connection terminals of the liquid crystal panel 28 is exposed from the protective member 19 to the outside.

Fifth Embodiment

Hereinafter, a display device according to a fifth embodiment that forms a display portion 1 of a cellular phone 10 will be described.

Figure 8:
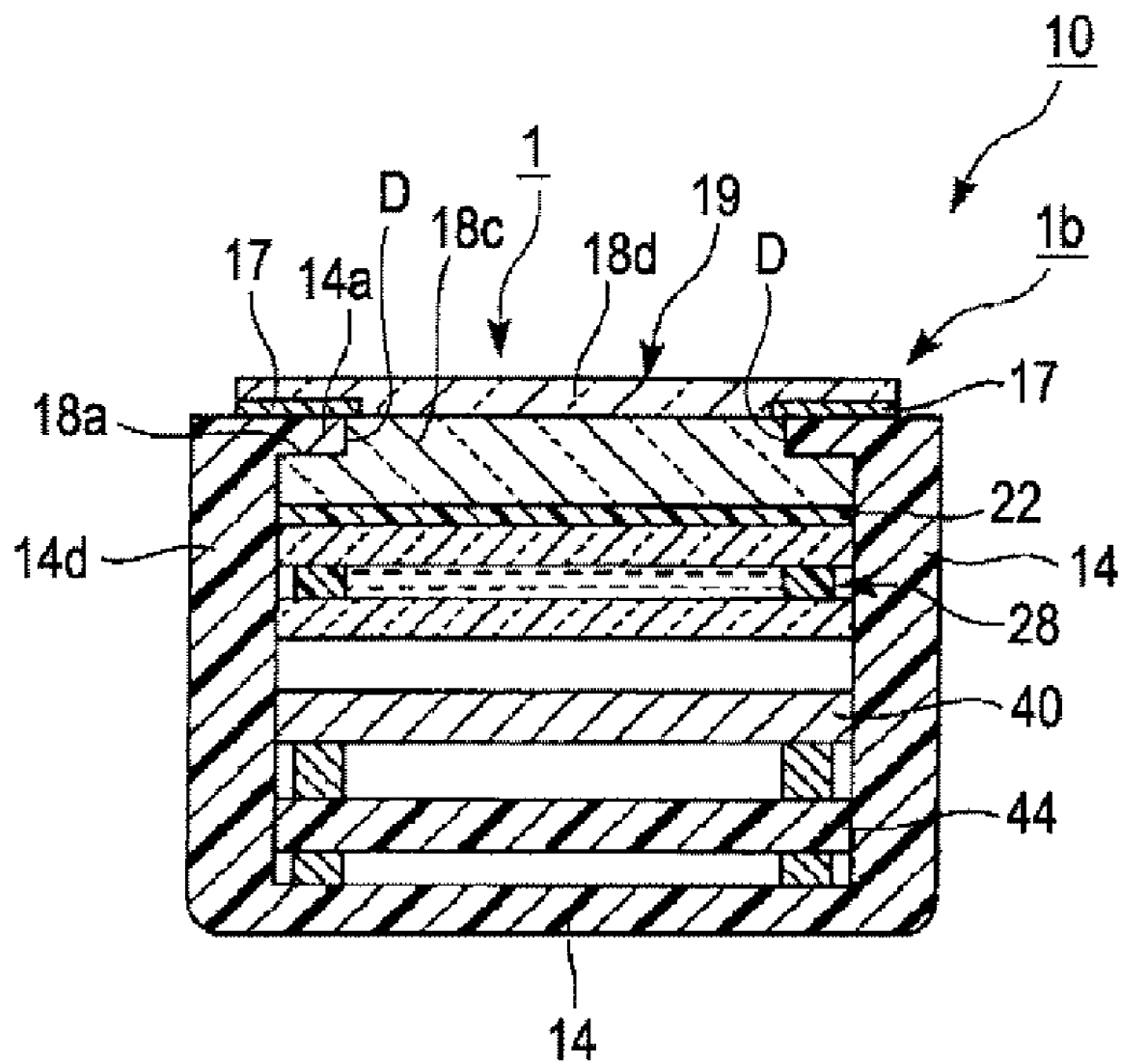
FIG. 8 is a cross-sectional view schematically illustrating a sectional structure of a display portion in which a display device according to a fifth embodiment is installed in a casing.

FIG. 8 is a diagram schematically illustrating a sectional structure of a display device 1b according to the fifth embodiment of the invention, which corresponds to FIG. 2 illustrating the display device 1a according to the first embodiment of the invention. In this case, the display device 1b according to the fifth embodiment of the invention illustrated in FIG. 8 is different from the display device 1a according to the first embodiment illustrated in FIG. 3 in the structure of the protective member 19. The adhesive layer 22 and the liquid crystal panel 28 in the liquid crystal device 1b illustrated in FIG. 8 have the same structures as those in the liquid crystal device 1a illustrated in FIG. 3. Therefore, in order to avoid a repetitive description, only the protective member 19 will be described.

In the display device 1b, the protective member 19 that protects the liquid crystal panel 28 includes a first light-transmitting substrate 18c that is made of an acrylic resin and has a thickness within a range of 0.2 to 0.3 mm, and a film 18d (second light-transmitting substrate) that is made of a material of polyethylene terephthalate and has a thickness within a range of 0.1 to 0.25 mm. That is, the protective member 19 includes the first light-transmitting substrate 18c and the second light-transmitting substrate 18d, and the fitting portion 14a of the holding member 14 is interposed between the first light-transmitting substrate 18c and the second light-transmitting substrate 18d. Even in this case, the protective member 19 has strength against a shock or the like due to the cellular phone being dropped.

The protective member 19 is disposed in the casing 14 and the first light-transmitting substrate 18c is bonded to the liquid crystal panel 28 with the adhesive layer 22 interposed therebetween. The bonding occurs along the surface of the first light-transmitting substrate 18c which is opposite to the side where the step portion D and the thin portion 18a are formed. The thickness of the first light-transmitting substrate 18c and the thickness of the end 14a (fitting portion) of the opening of the casing 14 are designed such that on the principal plane of the first light-transmitting substrate 18c at the side having the step portion D and the thin portion 18a, an upper surface of the thick portion of the first light-transmitting substrate 18c and an upper surface of the end 14a (fitting portion) of the opening of the casing 14 (the surface spaced apart from the thin portion 18a of the first light-transmitting substrate 18c) align with each other so as to be coplanar or flat (flush). Specifically, the first light-transmitting substrate 18c has the step portion D, the first light-transmitting substrate 18c and the end 14a of the opening are designed such that the depth of the step portion D and the thickness of the end 14a (fitting portion) of the opening are equal to each other in size, the end 14a of the opening is fitted into (nested within) the step portion D, and the first light-transmitting substrate 18c is assembled in the casing 14 to be mounted thereon.

Meanwhile, the second light-transmitting substrate 18d is mounted on the first light-transmitting substrate 18c and the end 14a of the opening whose surfaces are planarized (made flush). As described above, the first light-transmitting substrate 18c has the step portion D and the thin portion 18a, and the first light-transmitting substrate 18c and the second light-transmitting substrate 18d are bonded to each other in a state in which the step portion D and the thin portion 18a are spaced apart from the second light-transmitting substrate 18d. In addition, when the first light-transmitting substrate 18c and the second light-transmitting substrate 18d are bonded to each other, the end 14a (fitting portion) of the opening is fitted into a space that is generated by the step portion D of the thin portion 18a. As a result, the liquid crystal panel 28 having the protective member attached thereto can be integrated with the casing 14.

Further, on the surface (inner surface) of the second light-transmitting substrate 18d that is bonded to the first light-transmitting substrate 18c, light-shielding members 17 are formed. The light-shielding member 17 shields light from at least the end 14a (fitting portion) of the opening of the casing 14, and a sealant 32 of the liquid crystal panel 28. That is, the light-shielding member 17 is disposed more inwardly than the end 14a of the opening and the sealant 32 (display region side), such that it overlaps the end 14a of the opening in plan view and overlaps the sealant 32 of the liquid crystal panel 28 in plan view. Further, the second light-transmitting substrate 18d including the light-shielding member 17, and the casing 14 and the liquid crystal panel 28 align with each other.

Further, in the display device 1b according to the fifth embodiment of the invention having the above-mentioned structure, shock resistance, water resistance, and dust resistance may be provided to the liquid crystal panel 28 in the display device 1b by the protective member 19.

Further, according to the display device 1b according to the fifth embodiment, the protective member 19 has the first light-transmitting substrate 18c and the second light-transmitting substrate 18d, and the step portion D and the thin portion 18a are provided in the first light-transmitting substrate 18c. Accordingly, the first and second light-transmitting substrates 18c and 18d are bonded to each other such that the step portion D and the thin portion 18a are spaced apart from the second light-transmitting substrate 18d, and thus a space is formed between the first light-transmitting substrate 18c and the second light-transmitting substrate 18d in the step portion D and the thin portion 18a. The end 14a of the opening of the casing 14 can be fitted into the space, such that the liquid crystal panel 28 having the protective member attached thereto can be integrated with the casing 14.

In this case, since a specific member does not need to be prepared so as to attach the liquid crystal panel 28 to the casing 14, it is possible to prevent the size of the liquid crystal device 1a from being increased due to attaching the liquid crystal panel 28 to the casing 14, which leads to a decrease in the size of the liquid crystal device 1b. Further, since the first light-transmitting substrate 18c of the protective member 19 and the liquid crystal panel 28 are directly bonded to each other by the adhesive layer 22, an air layer is not formed between the protective member 19 and the liquid crystal panel 28. As a result, the display visibility from the liquid crystal panel 28 can be markedly improved.

Further, even in this case, the thin portion 18a of the first light-transmitting substrate 18c is formed along the outer circumference of one principal plane of the first light-shielding substrate 18c. If the step portion D and the thin portion 18a are bonded to the second light-transmitting substrate 18d so as to be opposite to the second light-transmitting substrate 18d, the thin portion 18a is formed at the interface between the first lights transmitting substrate 18c and the second light-transmitting substrate 18d so as to form the step portion D, thereby forming a space. In addition, the end 14a of the opening of the casing 14 is fitted into the space.

Further, the light-shielding member 17 is not limited to having a complete light-shielding property that completely shields light (display) from the liquid crystal panel 28, but also a semi-light-shielding property that shields a portion of the light from the liquid crystal panel 28. Alternatively, the light-shielding member 17 may have a black light-shielding member, and colored members that are colored with predetermined colors (for example, red, blue, green, and the like). The light-shielding member 17 is preferably made of a chromium metal, but this embodiment is not limited thereto. That is, the light-shielding member 17 may be made of a material, such as a resin black obtained by dispersing carbon or titanate in a photoresist, or a metal material, such as nickel and the like. Alternatively, for low reflection, the light-shielding member 17 may have a two-layered structure that has a chromium metal film and a chromium oxide film. Further, the first light-transmitting substrate 18c may be made of any one of a urethane resin and an epoxy resin, in addition to the acrylic resin.

Sixth Embodiment

Next, a method of manufacturing the protective member 19 that has been described in the first to fifth embodiments will be described with reference to FIGS. 9A to 9D and 10.

Figure 9A:
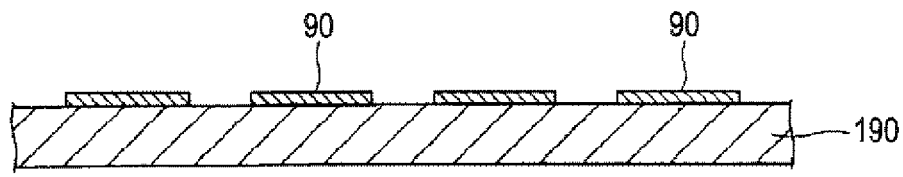
FIGS. 9A to 9D are cross-sectional views schematically illustrating an example of a process of manufacturing a protective member.
Figure 11:
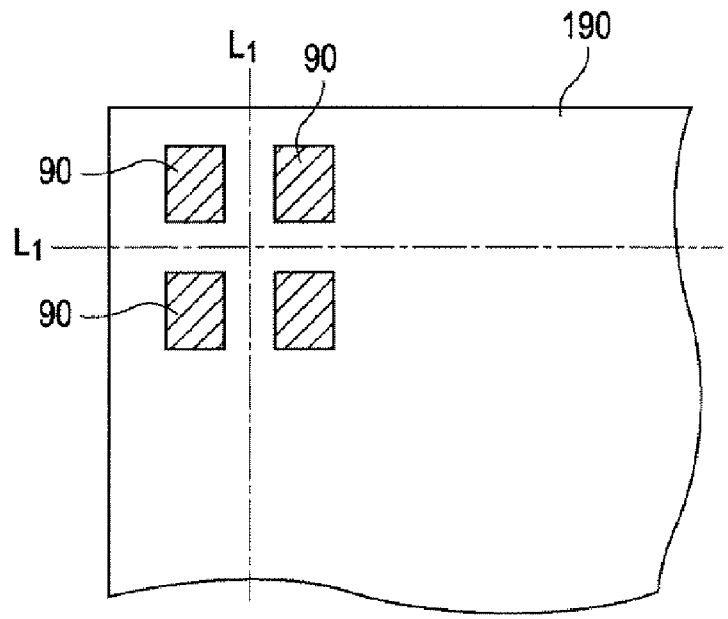
FIG. 11 is a plan view schematically illustrating a planar structure of a mother substrate.

First, a large-sized mother substrate 190 shown in FIGS. 9A and 11 is prepared. The large-sized mother substrate 190 is prepared for collectively forming the protective member 19, and includes a glass substrate. From one mother substrate 190, several to several tens of protective members 19 can be obtained.

Figure 10:
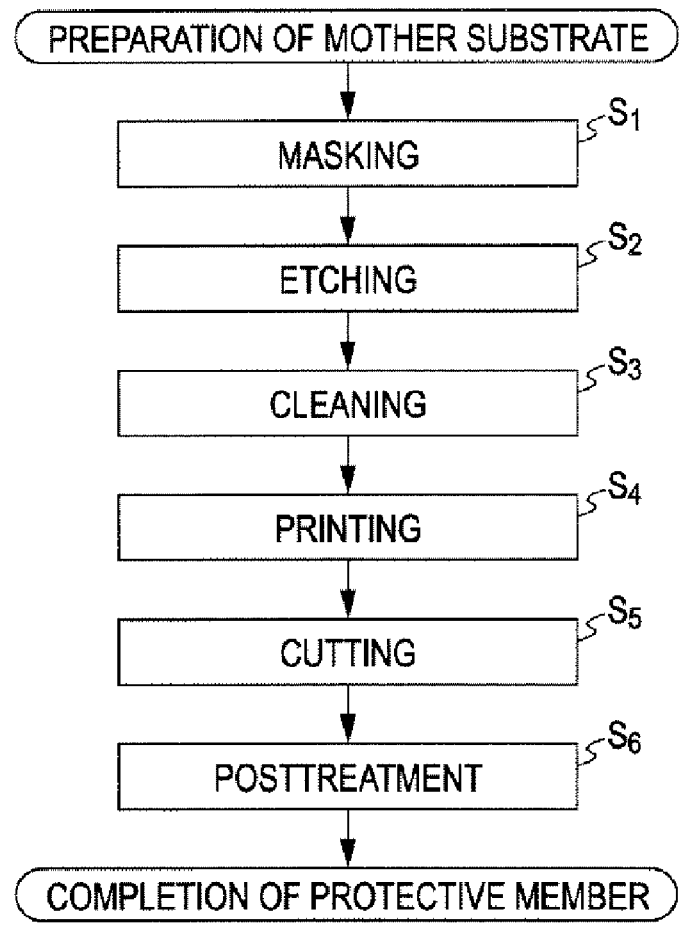
FIG. 10 is a flowchart illustrating an example of a process of manufacturing a protective member.

Masking is performed on the prepared mother substrate 190 (FIG. 10: S1). In this case, resists 90 where a step forming location is designated as a location of an opening are formed. The resist 90 is made of a photosensitive resin, and it is prepared through an exposure process.

Figure 9B:
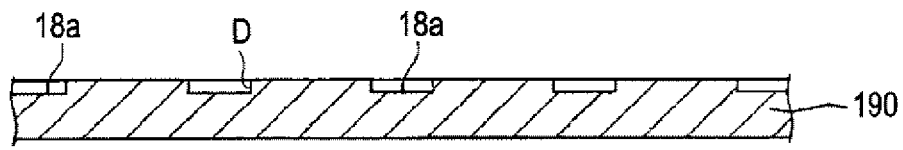

Then, wet etching is performed on the mother substrate 190 using the formed resists 90 as masks (FIG. 10: S2), and thin portions 18a shown in FIG. 9B are formed through a resist removing process and a cleaning process (FIG. 10: S3).

Figure 9C:
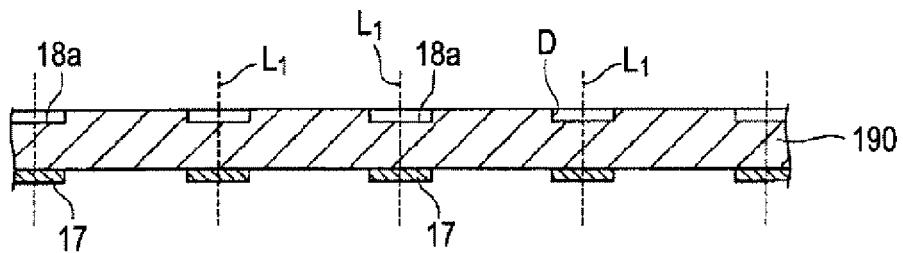
Figure 9D:
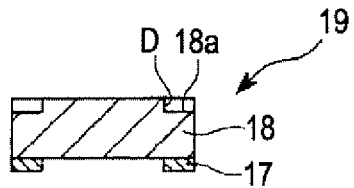

After the step portion D and the thin portions 18a are formed, light-shielding members 17 shown in FIG. 9C are formed. In this case, by using a printing method (FIG. 10: S4), the light-shielding members 17 made of a chromium metal is patterned and formed such that they overlap the thin portions 18a of the mother substrate 190 in plan view. Specifically, the light-shielding members 17 can be very easily formed by using a screen printing method.

Figure 12:
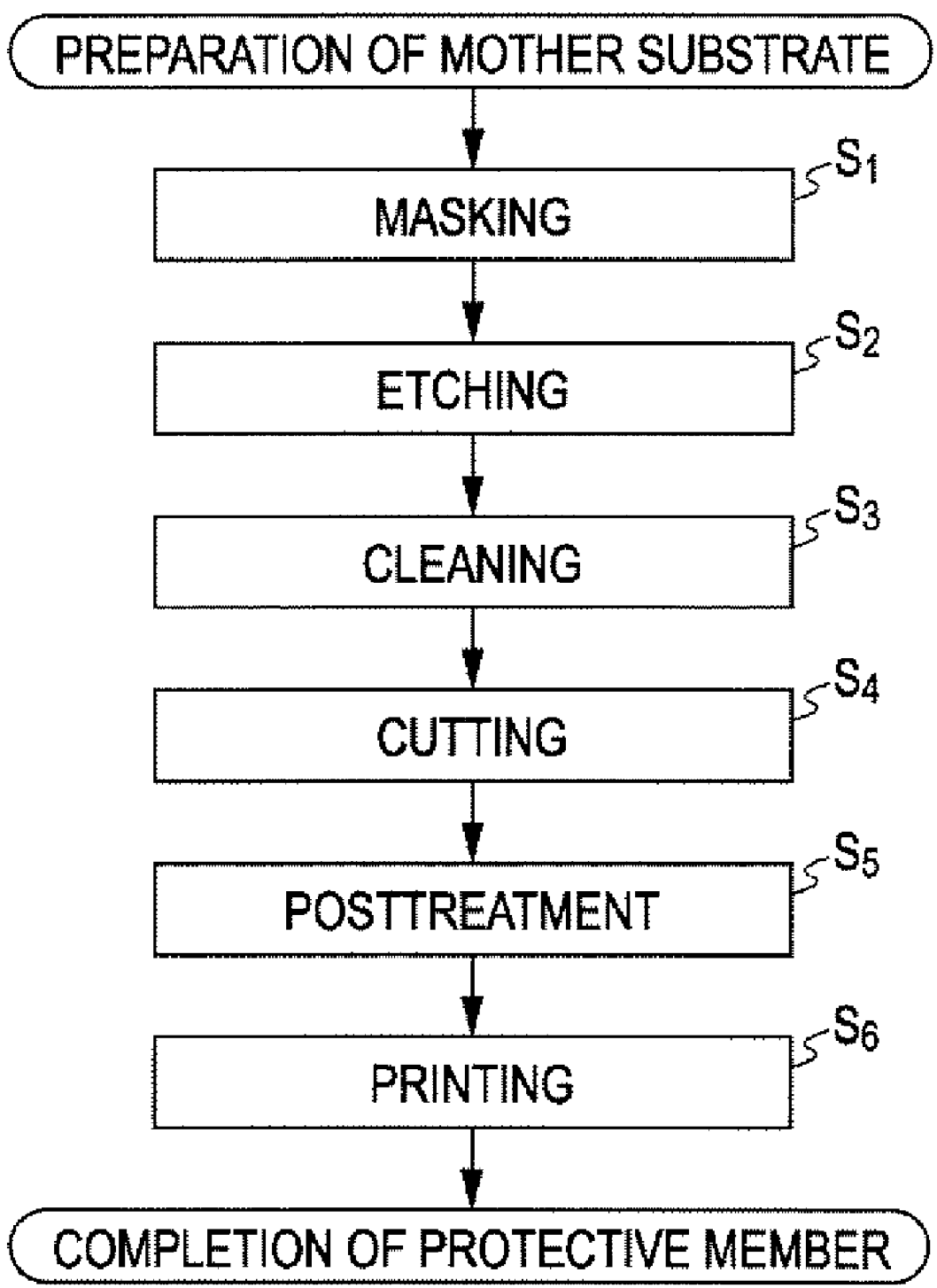
FIG. 12 is a flowchart illustrating a modification of a process of manufacturing a protective member.

Then, as shown in FIG. 9C, a cutting process of the mother substrate 190 is performed while using a center portion of the thin portions 18a of the mother substrate 190 as a scribing line L1 (see FIG. 11) (FIG. 10: S5), and then a surface polishing process or a surface enhancing process is performed as a post treatment (FIG. 10: S6), thereby completing the protective member 19 having the thin portion 18a of the substrate 18 and the light-shielding member 17 that are formed at the outer circumference of the light-transmitting substrate 18 shown in FIG. 9D. As shown in FIG. 12, after the cutting process (S4) and the post treatment (S5) are formed, the printing process (56) can be performed for forming the light-shielding member 17 with respect to an individual substrate.

Figure 13:
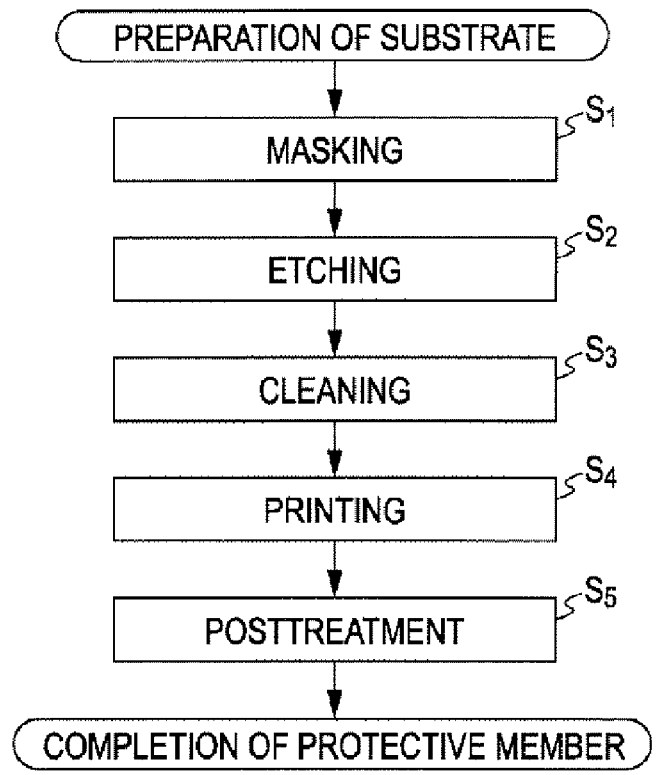
FIG. 13 is a flowchart illustrating a modification of a process of manufacturing a protective member.

Further, in the above-mentioned example, the plurality of protective members can be formed by using the large-sized mother substrate 190 so as to improve manufacture efficiency. However, as shown in FIG. 13, one protective member 19 may be individually formed from one mother substrate. In this case, the cutting process may be omitted.

According to the method of manufacturing the protective member 19, the protective member 19 that is included in the display devices 1a and 1b according to the above-mentioned embodiments can be appropriately manufactured. Specifically, according to the method of manufacturing the protective member 19, since the protective member 19 includes the light-transmitting glass substrate, the step portion D and the thin portion 18a can be easily formed at the outer circumference of the glass substrate by etching using a mask.

Seventh Embodiment

Figure 14:
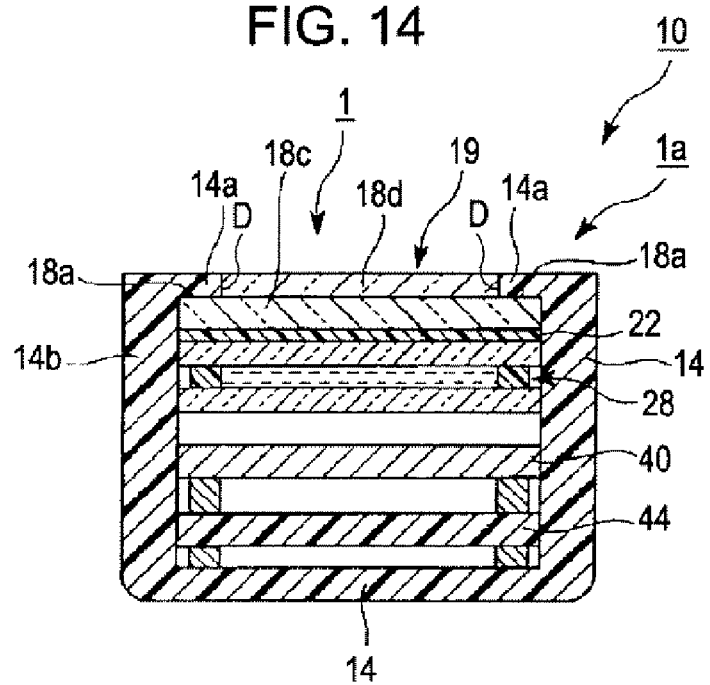
FIG. 14 is a cross-sectional view schematically illustrating a sectional structure of a peripheral portion of a display portion of a cellular phone.
Figure 15:
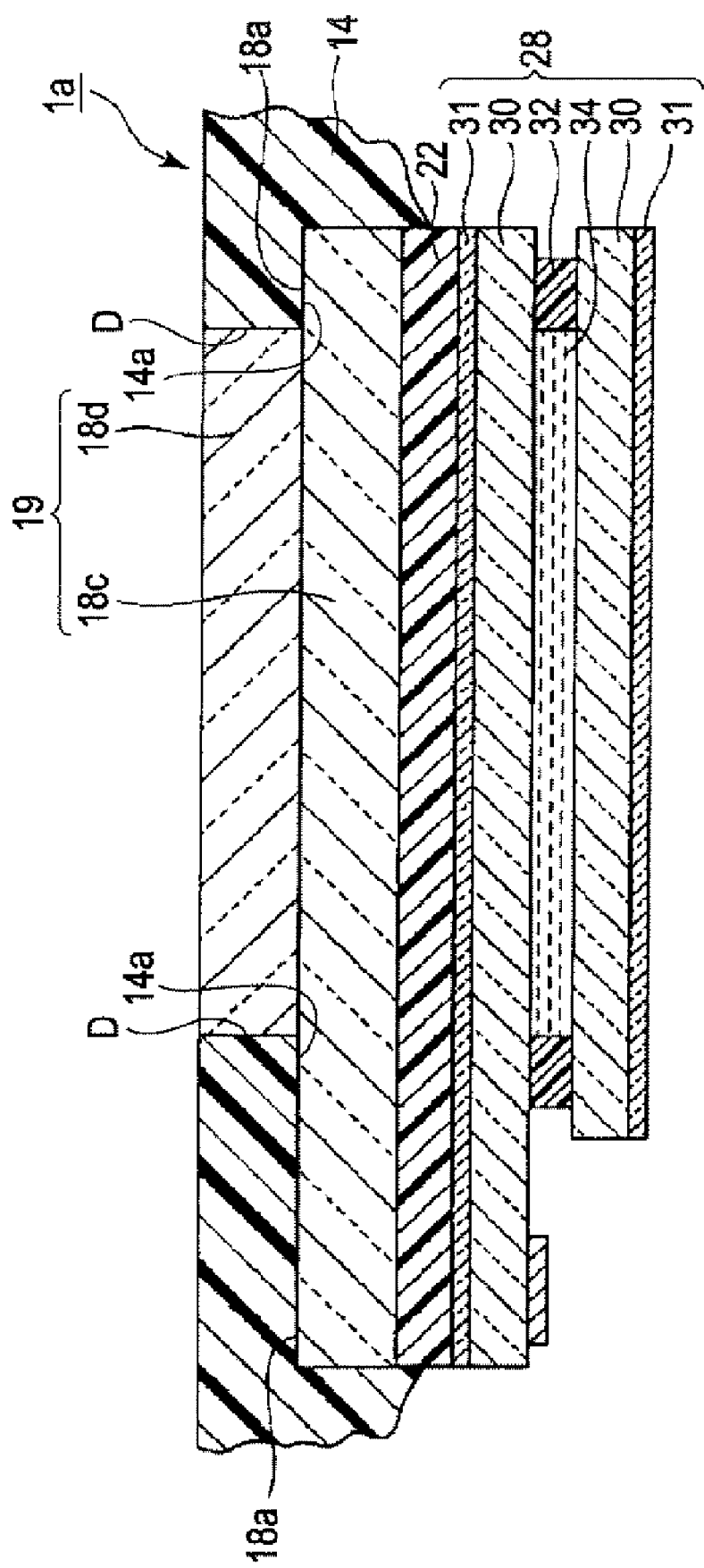
FIG. 15 is a cross-sectional view schematically illustrating a sectional structure of a display device included in a display portion.

FIG. 14 is a cross-sectional view schematically illustrating a sectional structure of a peripheral portion of a display portion of a cellular phone 10. FIG. 15 is a cross-sectional view schematically illustrating a sectional structure of a display device (electro-optical device) that is included in the cellular phone 10. In order to avoid a repetitive description, the same constituent elements as the first embodiment are denoted by the same reference numerals, and the description thereof will be omitted.

In the seventh embodiment, the display device 1a includes a liquid crystal device, and includes a liquid crystal panel 28 (electro-optical panel), a protective member 19, and an adhesive layer 22 that attaches the protective member 19 to the liquid crystal panel 28. In this case, the display device 1a is fixed to an inner side of the cylindrical casing 14 (holding member) of the cellular phone 10, and integrated with the casing 14 by engaging the step portions D and 14a that are respectively formed in the protective member 19 and the casing 14.

Meanwhile, the protective member 19 is attached to the liquid crystal panel 28 by the adhesive layer 22. The protective member 19 includes a lamination that is obtained by overlapping a first light-transmitting substrate 18c made of a tempered glass and a second light-transmitting substrate 18d made of polymethyl methacrylate (PMMA) or glass. In this case, the first light-transmitting substrate 18c and the second light-transmitting substrate 18d are bonded to each other with a hardening resin, and the second light-transmitting substrate 18d and the first light-transmitting substrate 18c are constructed such that an area of the principal plane of the second light-transmitting substrate 18d (substrate area) is smaller than an area of the principal plane of the first light-transmitting substrate 18c (substrate area).

Further, the second light-transmitting substrate 18d is disposed within the periphery of the first light-transmitting substrate 18c in plan view. As a result, at the outer circumference of the protective member 19, the thin portion 18a of the protective member 19 and the step portion D are formed. Further, the first light-transmitting substrate 18c has the thickness within a range of 0.2 to 0.8 mm (for example, 0.4 mm), and the second light-transmitting substrate 18d has the thickness within a range of 0.2 to 0.8 mm (for example, 0.4 mm). As such, the protective member 19 that is constructed by bonding the first light-transmitting substrate 18c to the second light-transmitting substrate 18d has strength against shock or the like due to the cellular phone 10 being dropped.

Further, portions of the casing 14 of the cellular phone 10 engage with the thin portion 18a and the step portion D that are formed along the outer circumference of the protective member 19. In this case, when the end 14a of the holding member disposed in the casing 14 and the thin portion 18a of the protective member 19 are disposed such that their sections overlap each other, the end 14a (fitting portion) of the holding member are fitted into (nested within) the step portion D of the protective member 19. As a result, the casing 14 and the protective member 19 (that is, liquid crystal panel 28) are integrated with each other.

The end 14a (fitting portion) of the holding member is constructed as a protrusion that protrudes inward from a main body 14b of the cylindrical casing 14 so as to cover an end surface of the screen. That is, the casing 14 is formed of a hollow cylindrical body, and the liquid crystal panel 28 is accommodated in the cylindrical body. Further, the end 14a of the holding member that is formed in the cylindrical body is fitted into the step portion D, and the first light-transmitting substrate 18c and the end 14a of the holding member are bonded to each other with an adhesive layer (not shown) interposed therebetween. Accordingly, the liquid crystal panel 28 is fixed on the first light transmitting substrate 18c with the adhesive layer 22 interposed therebetween. As a result, the liquid crystal panel 28 is suspended in a hollow inner portion of the casing 14, and not supported from the lower side in a vertical direction.

Meanwhile, the depth of the step portion D (height or distance between a surface of the second light-transmitting substrate 18d and a surface of an extending portion of the first light-transmitting substrate 18c) is designed according to the thickness of the end 14a of the holding member. In this embodiment, the depth of the step portion D is designed to be equal to the thickness of the end 14a of the holding member in size. As a result, the upper surface of the end 14a of the holding member (the surface spaced apart from the first light-transmitting substrate 18c) and the upper surface of the second light-transmitting substrate 18d (the surface spaced apart from the first light-transmitting substrate 18c) substantially align with each other so as to be coplanar or flat (flush), thereby forming a surface layer of the cellular phone 10. Further, the second light-transmitting substrate 18d may be formed of not only a substrate made of an acrylic resin but also a substrate made of a urethane resin or an epoxy resin.

The adhesive layer 22 that bonds the liquid crystal panel 28 to the protective member 19 (more particularly, the first light-transmitting substrate 18c of the protective member 19) is made of a transparent elastic resin that is formed over an entire display surface of the liquid crystal panel 28. In this case, the transparent elastic resin has a thermosetting property, as in a silicon resin such as silicon gel and the like, an acrylic resin, a urethane resin, and the like, has elasticity after the thermosetting treatment, and sufficiently transmits visible light, and it is formed at the thickness of about 30 μm.

The transparent elastic resin that forms the adhesive layer 22 has viscosity, and can firmly adhere to the polarizer 31 of the liquid crystal panel 28 and the first light-transmitting substrate 18c of the protective member 19 by adhesion. Further, the transparent elastic resin is advantageous in that it can firmly adhere to the liquid crystal panel 28 and the first light-transmitting substrate 18c by the thermosetting treatment without using an adhesive. The transparent elastic resin holds a predetermined elasticity after the thermosetting treatment. As such, since the transparent elastic resin has viscosity, the protective member 19 and the liquid crystal panel 28 can be held in an adhesion state without using a separate adhesive.

In the cellular phone 10 according to this embodiment, since the display device 1a forming a display portion 1 includes a liquid crystal device in which the surface of the liquid crystal panel 28 is covered by the protective member 19, it has improved shock resistance, and the liquid crystal panel 28 can be prevented from being damaged due to a shock generated in the case of being dropped. Further, in addition to the shock resistance, water resistance or dust resistance may be provided to the liquid crystal panel 28.

Further, the step portion D and the thin portion 18a are provided in the protective member 19, an the end 14a (fitting portion) of the casing 14 that serves as the protective member is fitted into the step portion D, and thus the liquid crystal panel 28 having the protective member attached thereto can be integrated with the casing 14. In this case, since a specific member does not need to be prepared so as to attach the casing 14 to the liquid crystal panel 28, it is possible to prevent the size of the liquid crystal device 1a from being increased due to attaching the liquid crystal panel 28 to the casing 14, which leads to a decrease in the size of the liquid crystal device 1a.

Further, since the protective member 19 and the liquid crystal panel 28 are directly bonded to each other by the adhesive layer 22, an air layer is not formed between the protective member 19 and the liquid crystal panel 28. As a result, the display visibility from the liquid crystal panel 28 can be markedly improved.

In this embodiment, the casing 14 is formed of a hollow cylindrical body, and the liquid crystal panel 28 is held in the cylindrical body. Further, when the protrusion-shaped end 14a (fitting portion) that is formed in the cylindrical body is fitted into the step portion D, the liquid crystal panel 28 and the casing 14 can be integrated with each other. By using this structure, the liquid crystal panel 28 having the protective member attached thereto can be securely integrated with the casing 14. In this embodiment, the liquid crystal panel 28 is suspended in the hollow inner portion of the casing 14, and it is not supported from the lower side in a vertical direction. As such, the liquid crystal panel 28 is suspended, and thus resistance to vibration is improved.

Further, in this embodiment, the protective member 19 and the liquid crystal panel 28 align with each other such that the thin portion 18a of the protective member 19 (a portion of the first light-transmitting substrate 18c that protrudes to the outside of the second light-transmitting substrate 18d) overlaps the outer circumference of the liquid crystal panel 28, that is, the thin portion 18a of the protective member 19 (a portion of the first light-transmitting substrate 18c that protrudes to the outside of the second light-transmitting substrate 18d) overlaps the sealant 32. Specifically, as shown in FIGS. 21A and 21B, the alignment between the protective member 19 and the liquid crystal panel 28 is performed by making an alignment mark 41 formed at a location overlapping the thin portion 18a and the step portion D of the protective member 19 overlap an alignment mark 42 formed at a location overlapping the sealant 32 of the liquid crystal panel 28. Further, after the alignment between the protective member 19 and the liquid crystal panel 28, a circuit board 12 that has external connection terminals of the liquid crystal panel 28 is exposed from the protective member 19 to the outside.

Eighth Embodiment

Hereinafter, a display device according to an eighth embodiment that forms a display portion 1 of a cellular phone 10 will be described.

Figure 16:
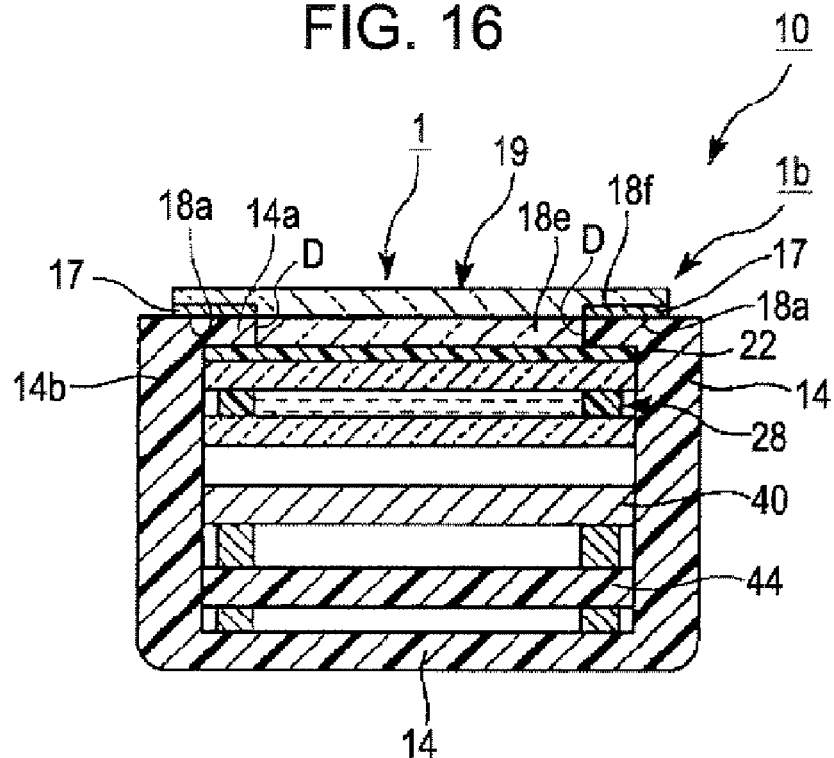
FIG. 16 is a cross-sectional view schematically illustrating a sectional structure of a display portion in which a display device according to an eighth embodiment is installed in a casing.

FIG. 16 is a diagram schematically illustrating a sectional structure of a display device 1b according to the eighth embodiment of the invention, which corresponds to FIG. 2 illustrating the display device 1a according to the first embodiment of the invention. In this case, the display device 1b according to the eighth embodiment of the invention illustrated in FIG. 16 is different from the display device 1a according to the seventh embodiment illustrated in FIG. 15 in the structure of the protective member 19, and the adhesive layer 22 and the liquid crystal panel 28 of the display device 1b shown in FIG. 16 are the same as those in the display device 1a shown in FIG. 15. Therefore, in order to avoid a repetitive description, only the protective member 19 will be described.

In the display device 1b, the protective member 19 that protects the liquid crystal panel 28 includes an inner substrate 18e that is made of tempered glass and has the thickness within a range of 0.2 to 0.8 mm, and an outer substrate 18f that is made of a material of PMMA or glass and has the thickness within a range of 0.2 to 0.8 mm. Even in this case, the protective member 19 has strength against shock or the like due to the cellular phone being dropped.

In the protective member 19, the inner substrate 18e (second light-transmitting substrate) is bonded to the liquid crystal panel 28 with the adhesive layer 22 interposed therebetween, and on an opposite surface, the inner substrate 18e is bonded to the outer substrate 18f (first light-transmitting substrate). In addition, in the eighth embodiment, the inner substrate 18e (second light-transmitting substrate) and the outer substrate 18f (first light-transmitting substrate) are formed such that an area of the principal plane of the inner substrate 18e is smaller than an area of the principal plane of the outer substrate 18f. Further, the inner substrate 18e is disposed in the periphery of outer substrate 18f in plan view (contained two-dimensionally). As a result, at the outer circumference of the protective member 19, a portion of the outer substrate 18f (first light-transmitting substrate), which protrudes from the inner substrate 18e (second light-transmitting substrate) to the outside, forms the thin portion 18a of the protective member 19.

Meanwhile, in the casing 14 that serves as the holding member, a protrusion-shaped end 14a (fitting portion) is provided. The end 14a is fitted into the step portion D of the protective member 19, and the casing 14 is integrated with the liquid crystal panel 28 having the protective member attached thereto. Accordingly, the protrusion-shaped end 14a (fitting portion) that is provided in the casing 14 is interposed between a portion 18a (thin portion of the protective member 19) of the outer substrate 18f (first light-transmitting substrate) extending from the inner substrate 18e (second light-transmitting substrate) to the outside, and the adhesive layer 22 (liquid crystal panel 28 having the adhesive layer 22 formed on the surface).

Further, on the surface of the outer substrate 18f that is bonded to the inner substrate 18e, the light-shielding member 17 is formed. The light-shielding member 17 shields light from at least a portion 18a (thin portion of the protective member 19) of the outer substrate 18f (first light-transmitting substrate) extending from the inner substrate 18e (second light-transmitting substrate) to the outside, the end 14a (fitting portion) of the casing 14, and the sealant 32 of the liquid crystal panel 28. That is, the light-shielding member 17 overlaps a portion 18a (thin portion of the protective member 19) of the outer substrate 18f (first light-transmitting substrate) extending from the inner substrate 18e (second light-transmitting substrate) to the outside and the end 14a (fitting portion) of the casing 14 in plan view, and overlaps the sealant 32 of the liquid crystal panel 28 in plan view. The patterns of the light-shielding member 17 are formed up to locations including the locations of a portion 18a (thin portion of the protective member 19) of the outer substrate 18f (first light-transmitting substrate) protruding from the inner substrate 18e (second light-transmitting substrate) to the outside, the end 14a (fitting portion) of the casing 14, and the sealant 32. Further, the outer substrate 18f including the light-shielding member 17, and the casing 14 and the liquid crystal panel 28 align with each other.

Further, the light-shielding member 17 is not limited to having a complete light-shielding property that completely shields light (display) from the liquid crystal panel 28, but also a semi-light-shielding property that shields a portion of the light from the liquid crystal panel 28. Alternatively, the light-shielding member 17 may have a black light-shielding member, and colored members that are colored with predetermined colors (for example, red, blue, green, and the like). The light-shielding member 17 is made of a chromium metal, but this embodiment is not limited thereto. That is, the light-shielding member 17 may be made of a material, such as a resin black obtained by dispersing carbon or titanate in a photoresist, or a metal material, such as nickel and the like. Alternatively, for low reflection, the light-shielding member 17 may have a two-layered structure that has a chromium metal film and chromium oxide film.

Even in the display device 1b according to the eighth embodiment having the above-mentioned structure, the shock resistance, the water resistance, and the dust resistance may be provided to the liquid crystal panel 28 in the display device 1b by the protective member 19.

Further, the protective member 19 has the inner substrate 18e that has the principal plane of a relatively small area, and the outer substrate 18f that has the principal plane of a relatively large area. Since the inner substrate 18e overlaps the outer substrate 18f so as to be disposed more inwardly than the outer substrate 18f, the step portion 18a is formed in the protective member 19. In addition, the end 14a (fitting portion) of the casing 14 is fitted into the step portion D, and the liquid crystal panel 28 having the protective member attached thereto can be integrated with the casing 14. In this case, since a specific member does not need to be prepared so as to attach the liquid crystal panel 28 to the casing 14, it is possible to prevent the size of the liquid crystal device 1a from being increased due to attaching the liquid crystal panel 28 to the casing 14, which leads to a decrease in the size of the display device 1b.

Further, since the inner substrate 18e of the protective member 19 and the liquid crystal panel 28 are directly bonded to each other by the adhesive layer 22, an air layer is not formed between the protective member 19 and the liquid crystal panel 28. As a result, the display visibility from the liquid crystal panel 28 can be markedly improved.

Ninth Embodiment

Figure 17:
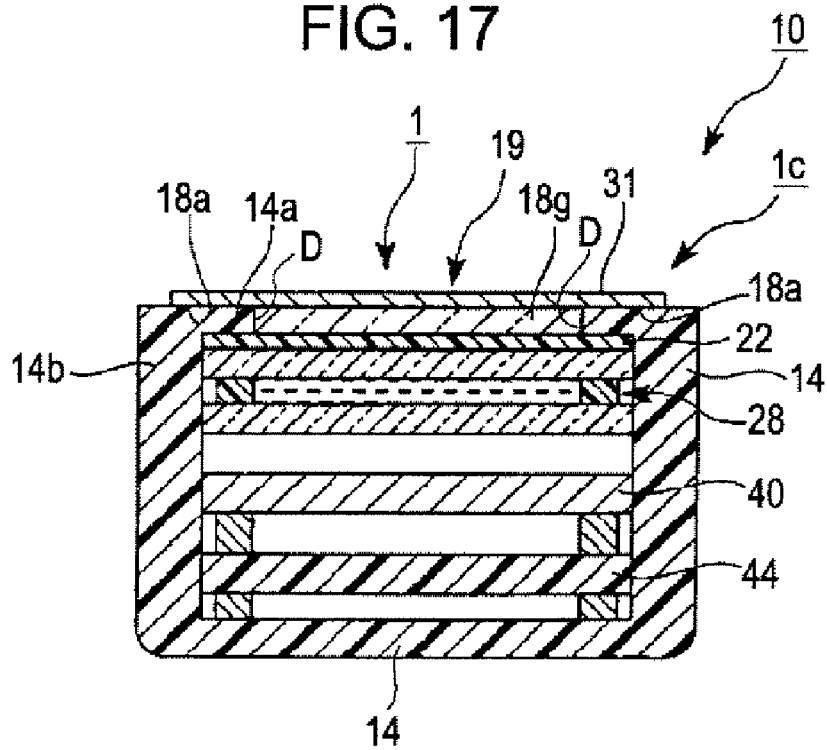
FIG. 17 is a cross-sectional view schematically illustrating a sectional structure of a display portion in which a display device according to a ninth embodiment is installed in a casing.
Figure 18:
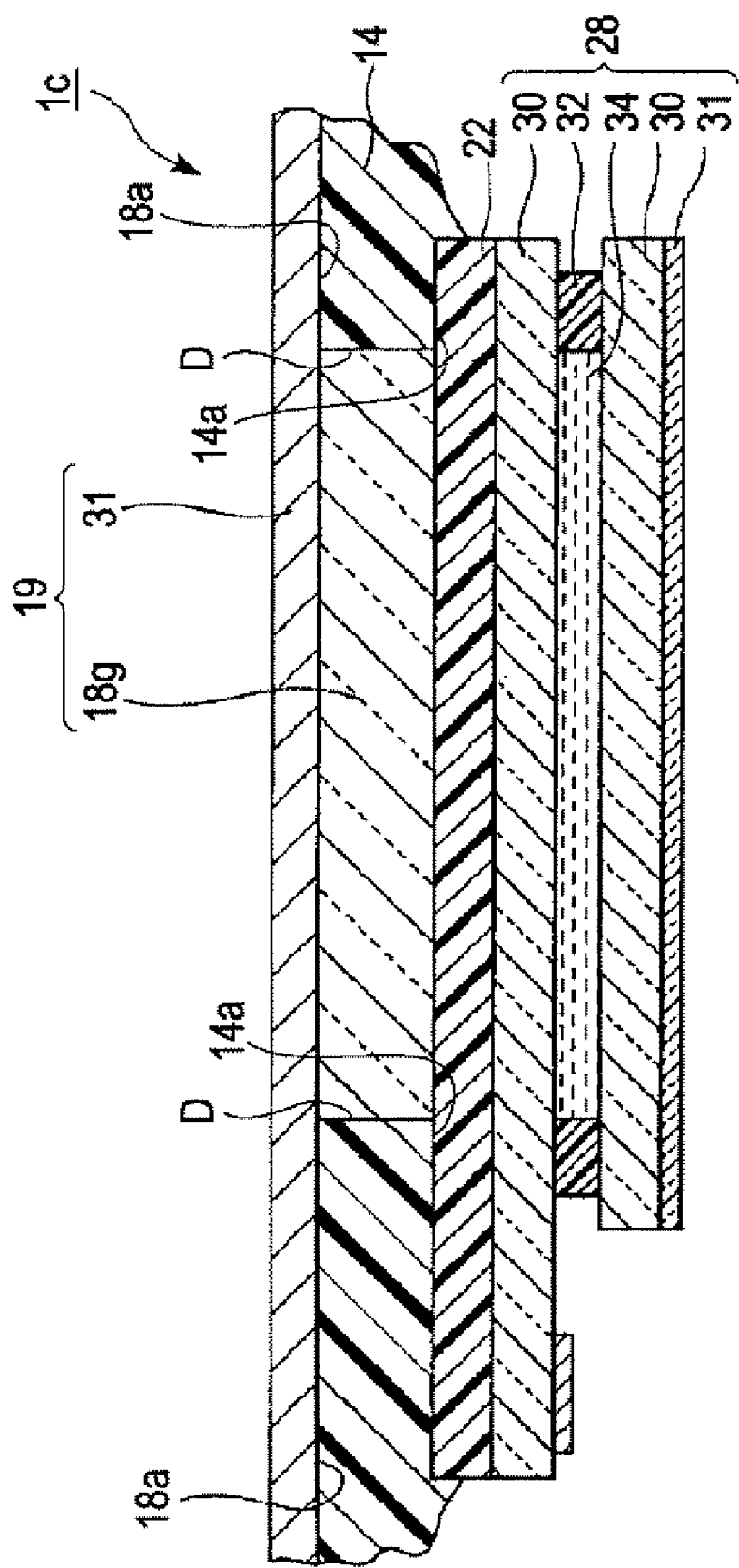
FIG. 18 is a cross-sectional view schematically illustrating a sectional structure of a display device included in a display portion of FIG. 17.

Hereinafter, a display device according to a ninth embodiment of the invention that forms a display portion 1 of a cellular phone 10 will be described. FIG. 17 is a diagram schematically illustrating a sectional structure of a display device 1c according to the ninth embodiment of the invention, which corresponds to FIG. 2 illustrating the display device 1a according to the first embodiment of the invention.

Even in the ninth embodiment, similar to the eighth embodiment, the protective member 19 has an inner substrate 18g (second light-transmitting substrate) that has a relatively small principal plane, and an outer substrate 31 (first light-transmitting substrate) that has a relatively large principle area. The inner substrate 18g overlaps the outer substrate 31 so as to be located more inwardly than the outer substrate 31. By using this structure, the step portion D and the thin portion 18a are formed in the protective member 19, the end 14a (fitting portion) of the casing 14 is fitted into the step portion D, and the liquid crystal panel 28 having the protective member attached thereto can be integrated with the casing 14.

Further, in the ninth embodiment, the outer substrate 31 that is disposed on the side of the display surface of the protective member 19 (that is, the side of the surface spaced apart from the adhesive layer 22) is used as a polarizer, such that linearly polarized light can be incident on the liquid crystal panel 28. As a result, as shown in FIG. 13, a polarizer is not provided on the liquid crystal layer 22 side of the liquid crystal panel 28.

Even in the display device 1c according to the ninth embodiment having the above-mentioned structure, the shock resistance, the water resistance, and the dust resistance may be provided to the liquid crystal panel 28 in the display device 1c by the protective member 19. Further, in this embodiment, since the polarizer 31 is formed on an outer surface of the protective member 19, it is possible to prevent glass splash from occurring.

Figure 19:
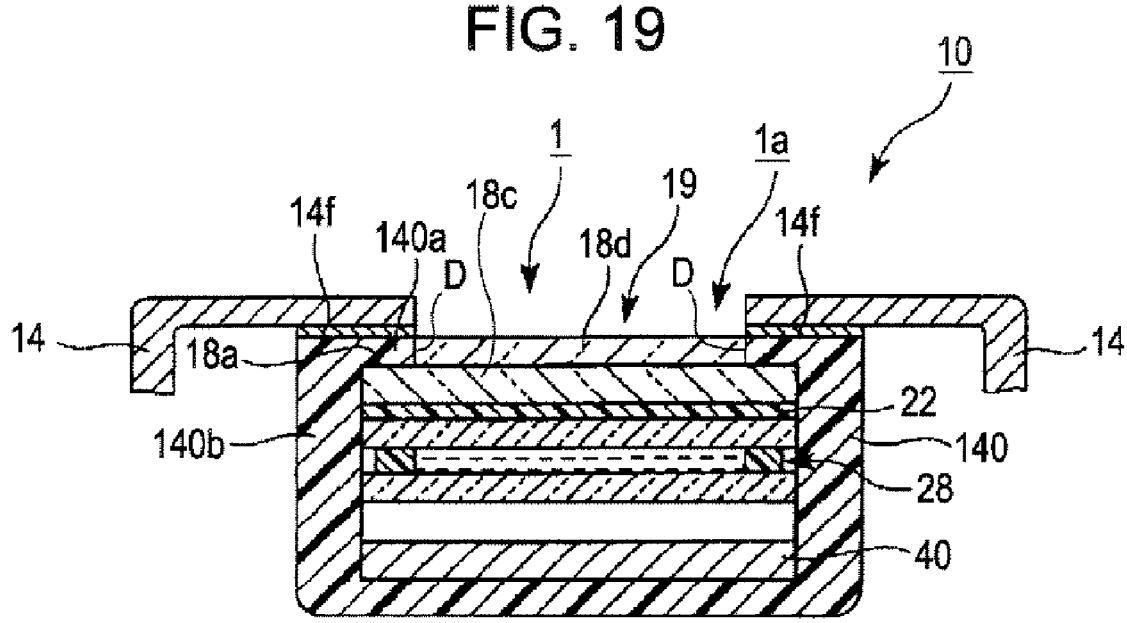
FIG. 19 is a cross-sectional view illustrating a modification where a display device is assembled in a casing of a cellular phone.

Further, in the above-mentioned embodiments, the liquid crystal panel 28 is integrated with the casing 14 of the cellular phone 10. However, as shown in FIG. 19, after the liquid crystal panel 28 is fixed to the metal frame 140, the casing 14 of the cellular phone 10 can be fixed on the top surface of the metal frame 140 with the adhesive layer 14f interposed therebetween. Even in this case, the protrusion-shaped end 140a (fitting portion) of the metal frame 140 (holding member) is fitted into the step portion D that is formed in the protective member 19 attached to liquid crystal panel 28, and thus the liquid crystal panel 28 having the protective member attached thereto can be integrated with the metal frame 140. In this case, the protrusion-shaped end 140a protrudes inward from the cylindrical casing body 140b. Similar to the seventh embodiment, a portion 18a (thin portion of the protective member 19) of the second light-transmitting substrate 18c that extends from the step portion D and the second light-transmitting substrate 18d to the outside can be formed by bonding the first light-transmitting substrate 18c and the second light-transmitting substrate 18d to each other, each of them has a different area of the principal plane.

Figure 20:
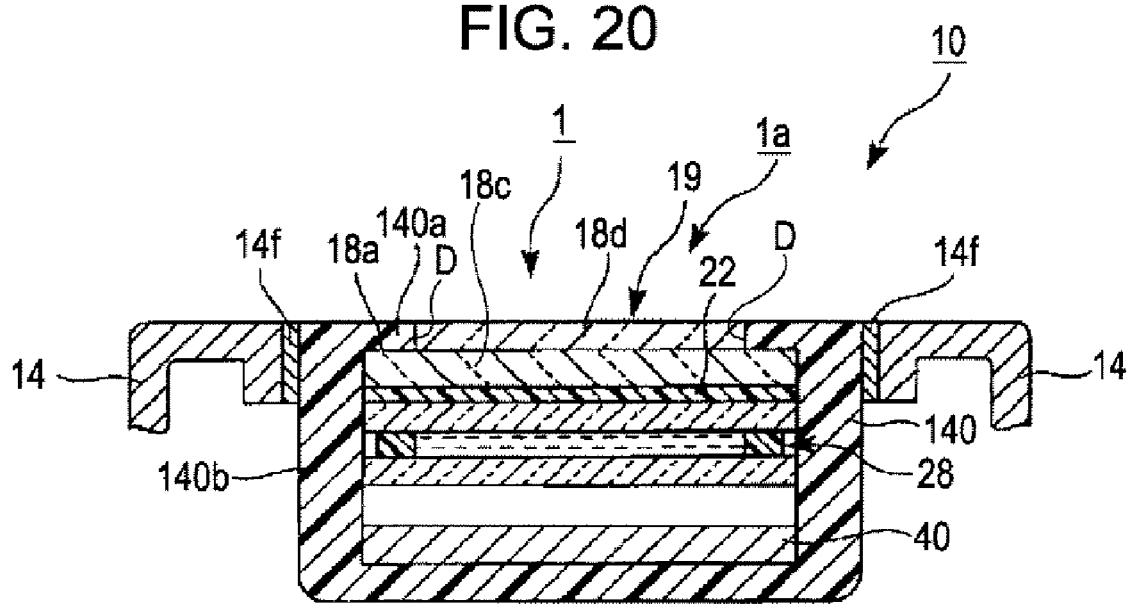
FIG. 20 is a cross-sectional view illustrating a modification where a display device is assembled in a casing of a cellular phone.

Alternatively, as shown in FIG. 20, after the liquid crystal panel 28 is fixed to the metal frame 140, the casing 14 of the cellular phone 10 can be fixed on the side surface of the metal frame 140 with the adhesive layer 14f interposed therebetween. Even in this case, the protrusion-shaped end 140a (fitting portion) of the metal frame 140 (holding member) is fitted into the step portion D that is formed in the protective member 19, and thus the liquid crystal panel 28 having the protective member attached thereto can be integrated with the metal frame 140. In this case, the protrusion-shaped end 140a (fitting portion) protrudes inward from the cylindrical casing body 140b. Similar to the seventh embodiment, a portion 18a (thin portion of the protective member 19) of the second light-transmitting substrate 18c that extends from the step portion D and the second light-transmitting substrate 18d to the outside can be formed by bonding the first light-transmitting substrate 18c and the second light-transmitting substrate 18d to each other, each of them has a different area of a principal lane.

Until now, various embodiments of the invention have been described, but the invention is not limited to the above-mentioned embodiments. That is, various changes and modifications can be made within a range of the spirit and scope of the invention.

For example, in the above-mentioned embodiments, the liquid crystal panel has been used as the electro-optical device (display panel) that forms the display devices 1a, 1b, and 1c, but the invention is not limited thereto. As the electro-optical device that forms the display devices 1a, 1b, and 1c, for example, an organic EL device, a plasma display device, an electrophoresis device, a device using an electron emission element, and the like can be used. Further, the casing of the cellular phone has been exemplified as the holding member that forms the electro-optical device, but the invention is not limited thereto. For example, a metal frame that fixes the display panel, such as the liquid crystal panel and the like, may also be exemplified as the holding member.

Further, in the eighth embodiment, the light-shielding member 17 is formed on the protective member 19 so as to shield a portion or all of the outer circumference of the liquid crystal panel 28. However, in a case in which a predetermined color member is used as the light-shielding member 17 and disposed in a predetermined pattern, the display portion 1 exposed from the protective member 19 can be decorated on the basis of the shape of the pattern of the light-shielding member 17.

Further, in the above-mentioned embodiments, the cellular phone has been exemplified as the electronic apparatus. Examples of the electronic apparatus that has the electro-optical device with the holding member may include a clock, a pager, a PDA, an electronic note, a notebook computer, an electronic calculator, a POS terminal, an IC card, a mini-disk player, or the like.

What is claimed is:

1. An electro-optical device comprising:
  an electro-optical panel having a first side and a second side, the second side being formed on an opposite side of the electro-optical panel than the first side;
  a protective member having a light-transmitting substrate mounted on the electro-optical panel adjacent to the first side;
  a backlight disposed adjacent to the second side of the electro-optical panel; and
  a holding member including a casing housing the electro-optical panel and the backlight, wherein:
  the protective member has:
  a thick portion where a thickness of the light-transmitting substrate is large;
  a thin portion where the thickness of the light-transmitting substrate is small, the thin portion extending around an outer circumference of the light-transmitting substrate; and
  a step portion extending a distance (D) between a top surface of the thick portion and a top surface of the thin portion of the light-transmitting substrate, wherein the top surface of the thick portion is positioned farther away from the backlight than the top surface of the thin portion,
  wherein the holding member has a fitting portion nested in the step portion of the protective member which extends the distance (D) and is positioned above the top surface of the thin portion of the light-transmitting substrate such that the thin portion of the light-transmitting substrate is positioned between the fitting portion and the backlight and a top surface of the fitting portion is flush with the top surface of the thick portion of the light-transmitting substrate, and wherein the light-transmitting substrate and the electro-optical panel are bonded to each other with an adhesive layer.

2. The electro-optical device according to claim 1, wherein the adhesive layer further comprises a hardening resin.

3. The electro-optical device according to claim 1, wherein the thin portion of the light-transmitting substrate is interposed between the electro-optical panel and the fitting portion of the holding member, the fitting portion of the holding member is nested within the step portion of the light-transmitting substrate.

4. The electro-optical device according to claim 1, wherein the casing includes an opening corresponding to a display region of the electro-optical panel, ends of the opening of the holding member form the fitting portion, the thick portion of the light-transmitting substrate of the protective member is fitted into the opening of the holding member, and the step portion of the protective member engage the fitting portion of the holding member.

5. The electro-optical device according to claim 1, wherein a light-shielding member is disposed such that the fitting portion of the holding member is in a region where the light shielding member locates.

6. A protective member to be applied to the electro-optical device of claim 1, comprising:

the protective member comprising:
- a light-transmitting substrate having an inner area and an outer circumference; and
- a flange provided along the outer circumference of the light-transmitting substrate, the flange defining a step portion along the outer circumference.

7. The protective member according to claim 6, further comprising: light-shielding member disposed on the light-transmitting substrate that shield a predetermined region of the electro-optical panel.

8. The protective member according to claim 7, wherein the light-shielding members are located in a region that covers at least the step portion in plan view.

9. The electro-optical device according to claim 1, further comprising a gap disposed between the backlight and the second side of the electro-optical panel.

10. An electro-optical device comprising:
- an electro-optical panel having a first side and a second side, the second side being formed on an opposite side of the electro-optical panel than the first side;
- a backlight disposed adjacent to the second side of the electro-optical panel;
- a light-transmitting protective member bonded to the first side of the electro optical panel, the protective member having a circumferential flange defining a step portion along a circumference of the protective member and extending a distance (D) between an upper top surface of the first side and a lower top surface of the first side, wherein the upper top surface is positioned farther away from the backlight than the lower top surface;
- and
- a holding member including a casing having a fitting portion nested within the step portion of the protective member which extends the distance (D) and is positioned above the lower top surface of the first side such that a top surface of the fitting portion is flush with the upper top surface of the first side, the electro-optical panel and backlight disposed within the casing.

11. The electro-optical device according to claim 10, wherein the circumferential flange of the protective member is interposed between the electro-optical panel and the fitting portion of the holding member.

12. The electro-optical device according to claim 10, further comprising a gap disposed between the backlight and the second side of the electro-optical panel.

* * * * *